(12) United States Patent
Hauser et al.

(10) Patent No.: US 9,313,947 B1
(45) Date of Patent: Apr. 19, 2016

(54) VEHICLE WITH PUMP ASSEMBLY

(71) Applicant: Hydro-Gear Limited Partnership, Sullivan, IL (US)

(72) Inventors: Raymond Hauser, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 438 days.

(21) Appl. No.: 14/020,411

(22) Filed: Sep. 6, 2013

Related U.S. Application Data

(63) Continuation of application No. 13/361,660, filed on Jan. 30, 2012, now Pat. No. 8,528,325, which is a continuation of application No. 12/626,254, filed on Nov. 25, 2009, now Pat. No. 8,104,277, which is a continuation of application No. 12/014,843, filed on Jan. 16, 2008, now Pat. No. 7,624,573, which is a continuation of application No. 11/622,530, filed on Jan. 12, 2007, now Pat. No. 7,347,047, which is a continuation of application No. 11/073,269, filed on Mar. 3, 2005, now Pat. No. 7,162,870, which is a continuation-in-part of application No. 10/987,681, filed on Nov. 12, 2004, now Pat. No. 7,377,105, and a continuation-in-part of application No. 11/020,699, filed on Dec. 23, 2004, now Pat. No. 7,146,810, said application No. 11/622,530 is a continuation-in-part of application No. 11/609,178, filed on Dec. 11, 2006, now abandoned, which is a continuation of application No. 11/020,699, filed on Dec. 23, 2004, now Pat. No. 7,146,810, which is a continuation-in-part of application No. 10/987,681, filed on Nov. 12, 2004, now Pat. No. 7,377,105.

(51) Int. Cl.
*F16D 31/02* (2006.01)
*A01D 34/64* (2006.01)
*A01D 34/80* (2006.01)
*B60K 17/10* (2006.01)
*F04B 23/06* (2006.01)

(52) U.S. Cl.
CPC ............... *A01D 34/64* (2013.01); *A01D 34/80* (2013.01); *B60K 17/105* (2013.01); *F04B 23/06* (2013.01); *F16D 31/02* (2013.01)

(58) Field of Classification Search
CPC .... B60K 7/0015; B60K 17/10; B60K 17/105; B60K 2025/026; B60K 25/06; B60K 25/065
See application file for complete search history.

(56) References Cited

U.S. PATENT DOCUMENTS

| | | | |
|---|---|---|---|
| 1,539,616 | A | 5/1925 | Williams |
| 1,668,213 | A | 5/1928 | Landine |

(Continued)

FOREIGN PATENT DOCUMENTS

| | | |
|---|---|---|
| EP | 1473183 | 1/2009 |
| JP | 2000-009023 | 1/2000 |

(Continued)

*Primary Examiner* — Michael Leslie
(74) *Attorney, Agent, or Firm* — Neal, Gerber & Eisenberg LLP

(57) ABSTRACT

A vehicle including a pump apparatus having a housing in which an end cap is disposed, and a mower deck is disclosed. Multiple hydraulic pumps driven by a prime mover are mounted on the end cap and connected to hydraulic ports formed in the end cap. An auxiliary pump may be drivingly coupled to the prime mover and a power take off unit may also be connected thereto to drive the mower deck. The end cap may further include a charge pump mounting surface and a charge port for connecting a charge pump.

20 Claims, 29 Drawing Sheets

(56) References Cited

U.S. PATENT DOCUMENTS

| | | | |
|---|---|---|---|
| 2,875,701 | A | 3/1959 | Ebert |
| 2,914,219 | A | 11/1959 | Chiantelassa |
| 3,279,172 | A | 10/1966 | Kudo et al. |
| 3,367,105 | A | 2/1968 | Dowty |
| 3,486,335 | A | 12/1969 | Kern et al. |
| 3,643,433 | A | 2/1972 | Widmaier |
| 3,859,790 | A | 1/1975 | Bacquie et al. |
| 3,922,931 | A | 12/1975 | Osujyo et al. |
| 4,116,292 | A | 9/1978 | Todeschini et al. |
| 4,252,508 | A | 2/1981 | Forster |
| 4,256,439 | A | 3/1981 | Kosodo et al. |
| 4,270,408 | A | 6/1981 | Wagner |
| 4,327,603 | A | 5/1982 | Zuanberger et al. |
| 4,426,911 | A | 1/1984 | Robinson et al. |
| 4,534,271 | A | 8/1985 | Forster |
| 4,819,508 | A | 4/1989 | Yamaoka et al. |
| 4,893,524 | A | 1/1990 | Ohashi et al. |
| 4,971,535 | A | 11/1990 | Okada et al. |
| 5,040,429 | A | 8/1991 | Del Castillo |
| 5,078,222 | A | 1/1992 | Hauser et al. |
| 5,207,060 | A | 5/1993 | Sheets |
| 5,247,794 | A | 9/1993 | Benson et al. |
| 5,304,043 | A | 4/1994 | Shilling |
| 5,354,180 | A | 10/1994 | Forster |
| 5,392,670 | A | 2/1995 | Hauser |
| 5,501,578 | A | 3/1996 | Skirde |
| 5,542,307 | A | 8/1996 | Hasegawa et al. |
| 5,800,134 | A | 9/1998 | Hasegawa et al. |
| 6,022,198 | A | 2/2000 | Hoffmeister |
| 6,199,380 | B1 | 3/2001 | Ishii |
| 6,267,189 | B1 | 7/2001 | Nielsen et al. |
| 6,301,885 | B1 | 10/2001 | Johnson et al. |
| 6,332,393 | B1 | 12/2001 | Trimble |
| 6,361,282 | B1 | 3/2002 | Wanschura |
| 6,363,815 | B1 | 4/2002 | Ishimaru et al. |
| 6,382,339 | B1 | 5/2002 | Nemoto |
| 6,425,244 | B1 | 7/2002 | Ohashi et al. |
| 6,474,218 | B2 | 11/2002 | Saito et al. |
| 6,487,856 | B1 | 12/2002 | Ohashi et al. |
| 6,494,686 | B1 | 12/2002 | Ward |
| 6,578,656 | B2 | 6/2003 | Samejima et al. |
| 6,672,058 | B1 | 1/2004 | Langenfeld et al. |
| 6,672,843 | B1 | 1/2004 | Holder et al. |
| 6,705,840 | B1 | 3/2004 | Hauser et al. |
| 6,736,605 | B2 | 5/2004 | Ohashi et al. |
| 6,804,958 | B1 * | 10/2004 | Poplawski ............... F16D 31/02 60/436 |
| 6,820,403 | B2 | 11/2004 | Unemoto |
| 6,887,302 | B2 | 5/2005 | Rajagopalan et al. |
| 6,953,327 | B1 | 10/2005 | Hauser |
| 6,973,783 | B1 | 12/2005 | Hauser et al. |
| 6,988,580 | B2 | 1/2006 | Ohashi et al. |
| 7,028,472 | B2 | 4/2006 | Ohashi et al. |
| 7,044,259 | B2 | 5/2006 | Stoll et al. |
| 7,073,330 | B1 * | 7/2006 | Hauser ................ B62D 11/003 60/487 |
| 7,146,810 | B1 | 12/2006 | Hauser et al. |
| 7,162,870 | B1 | 1/2007 | Hauser |
| 7,334,404 | B2 | 2/2008 | Sakikawa et al. |
| 7,347,047 | B1 | 3/2008 | Hauser |
| 7,370,714 | B2 | 5/2008 | Yasuda et al. |
| 7,377,105 | B1 | 5/2008 | Raymond |
| 7,520,346 | B2 | 4/2009 | Tate et al. |
| 7,610,985 | B2 | 11/2009 | Ohashi |
| 7,621,353 | B2 | 11/2009 | Ishii |
| 7,624,573 | B1 * | 12/2009 | Hauser .................... F16D 31/02 60/484 |
| 7,918,088 | B1 | 4/2011 | Hauser |
| 8,104,277 | B1 * | 1/2012 | Raymond ............... F16D 31/02 60/484 |
| 8,528,325 | B1 * | 9/2013 | Hauser .................... F16D 31/02 60/435 |

FOREIGN PATENT DOCUMENTS

| | | |
|---|---|---|
| JP | 2001-146951 | 5/2001 |
| JP | 2001-263259 | 9/2001 |
| WO | 9967532 | 12/1999 |

* cited by examiner

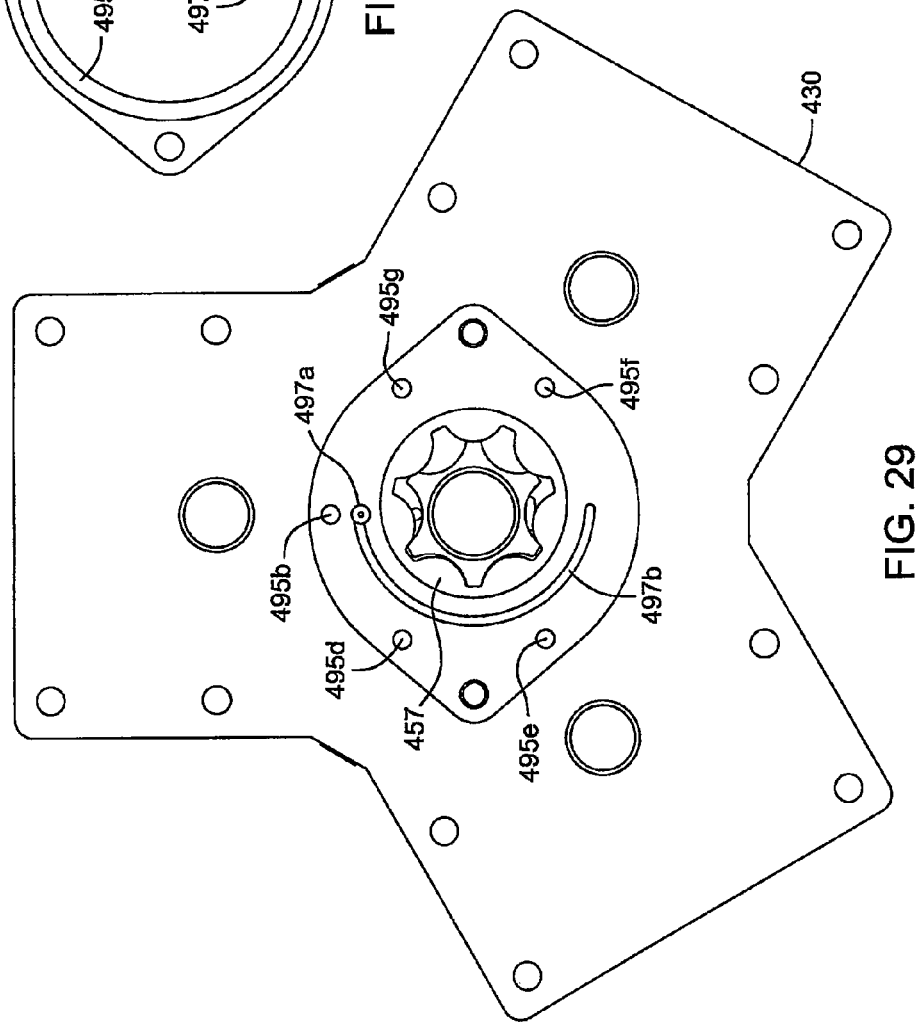

VEHICLE WITH PUMP ASSEMBLY

CROSS REFERENCE TO RELATED APPLICATIONS

This application is a continuation of U.S. patent application Ser. No. 13/361,660 filed on Jan. 30, 2012; which is a continuation application is a continuation of U.S. patent application Ser. No. 12/626,254 filed on Nov. 25, 2009, now U.S. Pat. No. 8,104,227; which is a continuation of U.S. patent application Ser. No. 12/014,843 filed on Jan. 16, 2008, now U.S. Pat. No. 7,624,573; which is a continuation of U.S. patent application Ser. No. 11/622,530 filed on Jan. 12, 2007, now U.S. Pat. No. 7,347,047; which is a continuation of U.S. patent application Ser. No. 11/073,269 filed on Mar. 3, 2005, now U.S. Pat. No. 7,162,870; which is a continuation-in-part of U.S. patent application Ser. No. 10/987,681, filed on Nov. 12, 2004, now U.S. Pat. No. 7,337,105; and a continuation-in-part of U.S. patent application Ser. No. 11/020,699, filed on Dec. 23, 2004, now U.S. Pat. No. 7,146,810. U.S. patent application Ser. No. 11/622,530 is also a continuation-in-part of U.S. patent application Ser. No. 11/609,178 filed on Dec. 11, 2006, now abandoned; which is a continuation of U.S. patent application Ser. No. 11/020,699 filed on Dec. 23, 2004, now U.S. Pat. No. 7,146,810; which is a continuation-in-part of U.S. patent application Ser. No. 10/987,681 filed on Nov. 12, 2004, now U.S. Pat. No. 7,377,105. All of these prior applications are incorporated herein by reference in their entirety.

BACKGROUND OF THE INVENTION

This application relates in general to hydrostatic pumps and transmissions and in particular to a multi-pump arrangement. Hydrostatic pumps are well-known for use in driving vehicles such as tractors and other off-road devices. Such pumps are also used in a wide variety of industrial applications other than vehicles.

In one known arrangement for a vehicle, a plurality of pumps is mounted in separate housings on a vehicle frame. Each pump is connected to a respective hydrostatic motor through high pressure hoses, which are often connected to the pump through an end cap. The end cap is secured to the pump housing and includes a running surface for the pump cylinder block and porting to connect the cylinder block to the hoses.

A control arm is engaged to each hydrostatic pump to control the output of the pump. In a known design, the hydrostatic pump is of an axial piston design and the control arm is engaged to a swash plate, the rotation of which can change the output of the pump from forward to neutral to reverse. Rotation of the pumps is provided by rotary input shafts which are separately driven by the vehicle engine through pulleys and belts or other known methods. The pump transmits hydraulic fluid through one of a pair of high pressure hoses to a hydrostatic motor. Rotational output of the motor is then transmitted to the vehicle drive wheels through an output axle or other known means.

Such an arrangement allows for zero turn capability, since the hydrostatic pumps may be operated independently of one another. However, there is a cost involved with this arrangement, as it requires at least four separate housings for the individual pumps and motors, and each housing must be individually secured to the vehicle frame.

A BDU transmission, which is a hydrostatic transmission ("HST") that is currently known in the industry, comprises a single housing enclosing both a hydrostatic pump and a hydrostatic motor, both of which are mounted to a single plate. The pump input shaft and motor output shaft are parallel to one another, and the plate contains hydraulic porting to connect the pump and motor. One such hydrostatic transmission is shown in U.S. Pat. No. 5,392,670. Such an HST is generally used to connect to a drive train for powering output axles of a tractor or similar vehicle.

SUMMARY OF THE INVENTION

A multi-pump apparatus for use on a vehicle or industrial application having a housing in which hydraulic pumps are mounted and driven by a prime mover is provided. The prime mover is drivingly coupled to a main input shaft, which drives the hydraulic pumps. An auxiliary pump may be drivingly coupled to the main drive shaft and a power take off unit may also be connected thereto.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

FIG. 29 is an end view of the fifth embodiment with the fan, gear chamber cover, and charge cover removed for clarity.

FIG. 30 is an interior view of the charge cover of the fifth embodiment.

DETAILED DESCRIPTION OF THE DRAWINGS

The following is a description of the multiple embodiments of this invention. Where appropriate, like numerals indicate identical or substantially identical components, and similar numerals with a different initial numeral indicate similar components with certain differences as specified. Further, in each of the embodiments discussed herein, identical numerals followed by "a" and "b" identify elements that are either identical or are mirror images of each other. Therefore, for convenience, the descriptions of elements with numerals followed by "a" apply equally to elements with identical numerals followed by "b."

Figure 1:
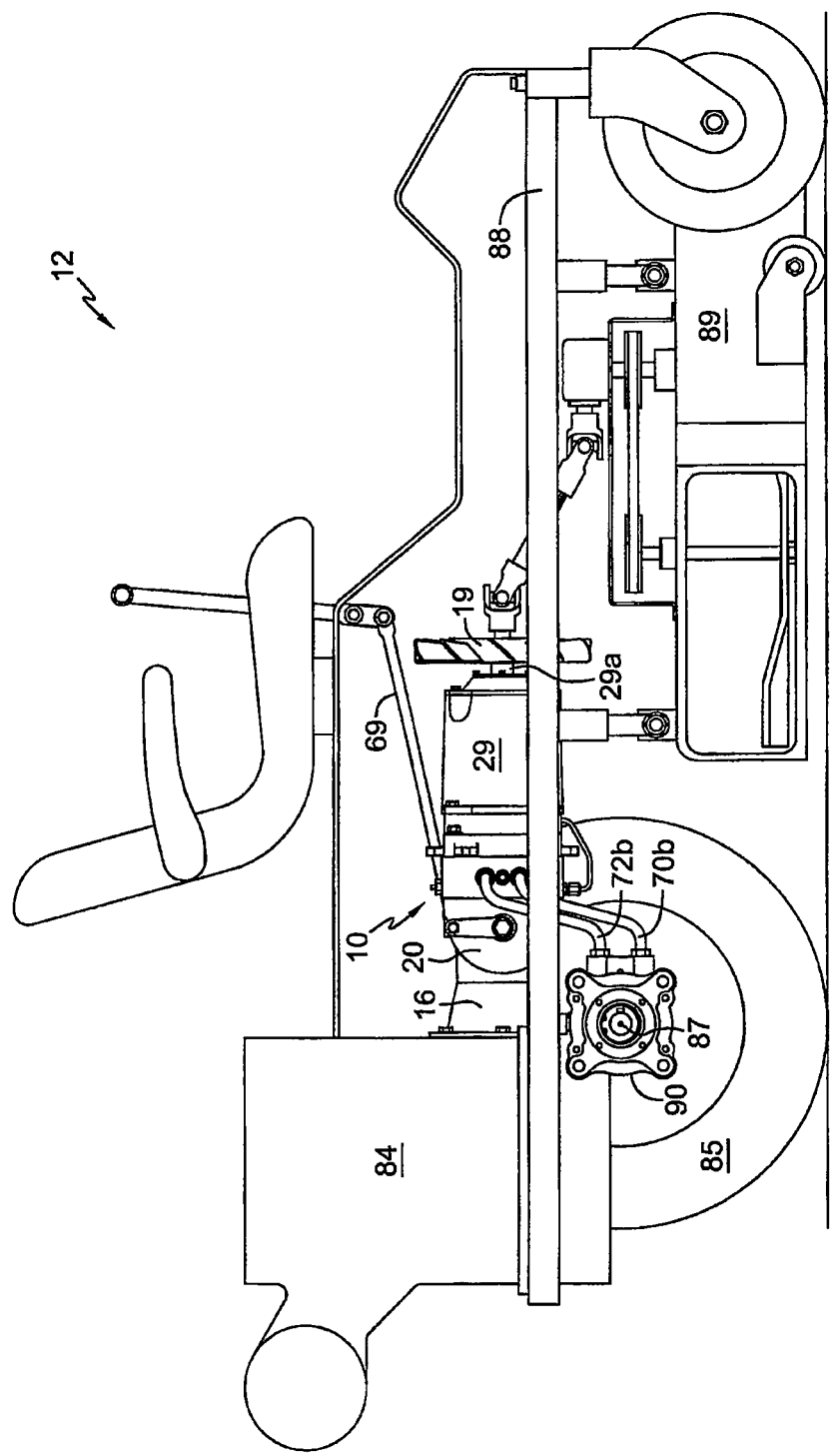
FIG. 1 depicts a vehicle employing a first embodiment of the drive assembly of the present invention with one drive wheel removed for clarity.
Figure 4:
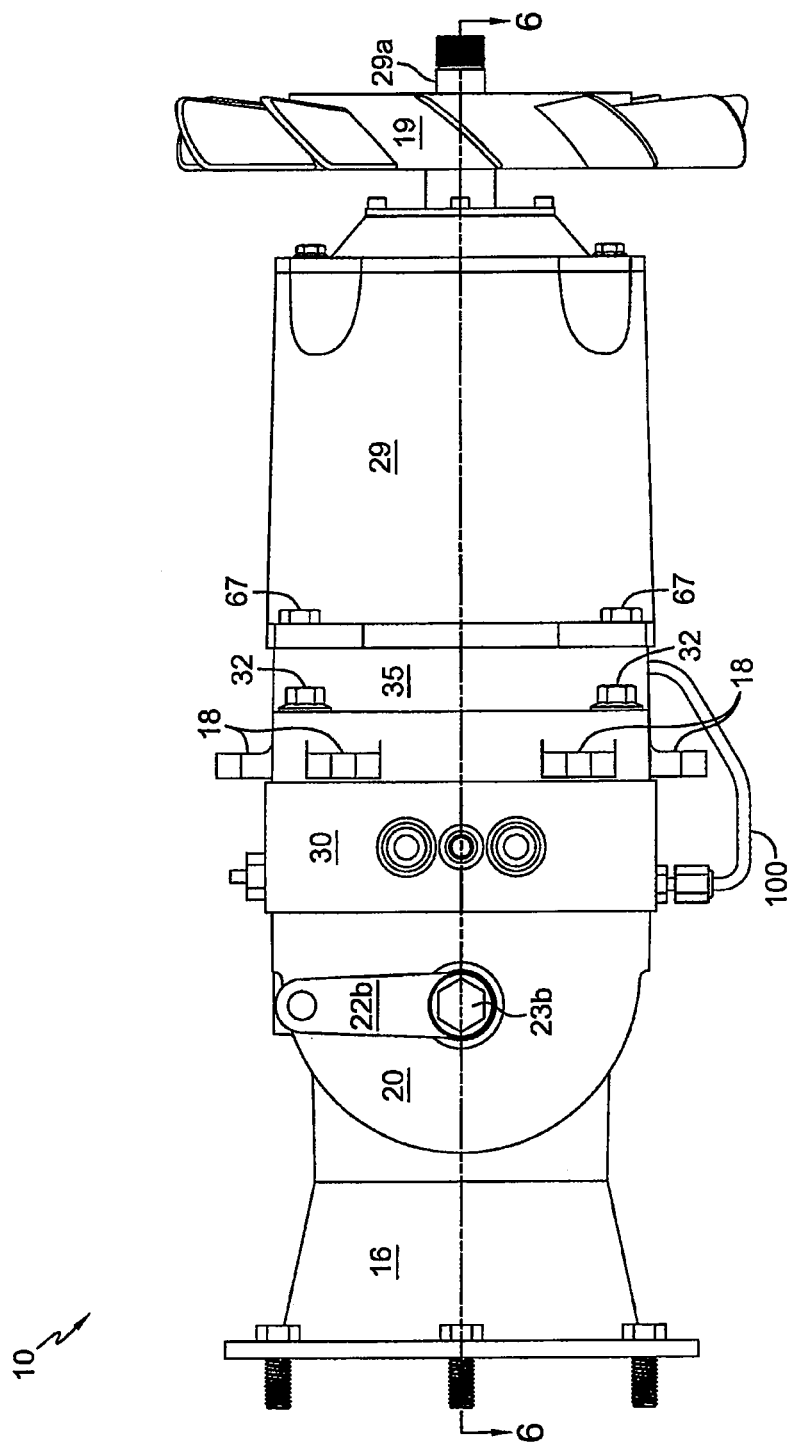
FIG. 4 is a side view of the external casing of a first embodiment of this invention.
Figure 5:
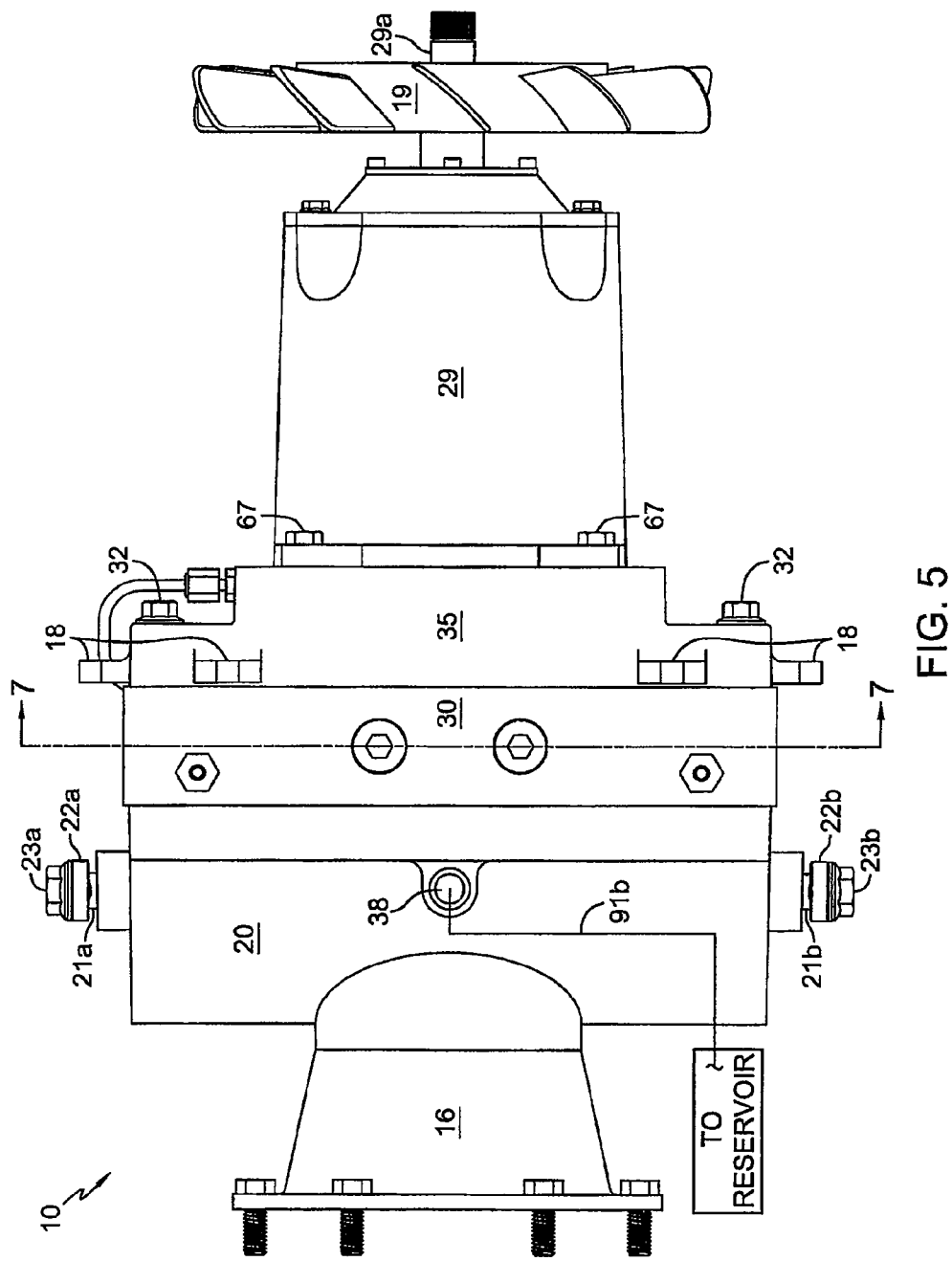
FIG. 5 is a top view of the dual pump design shown in FIG. 4.
Figure 6:
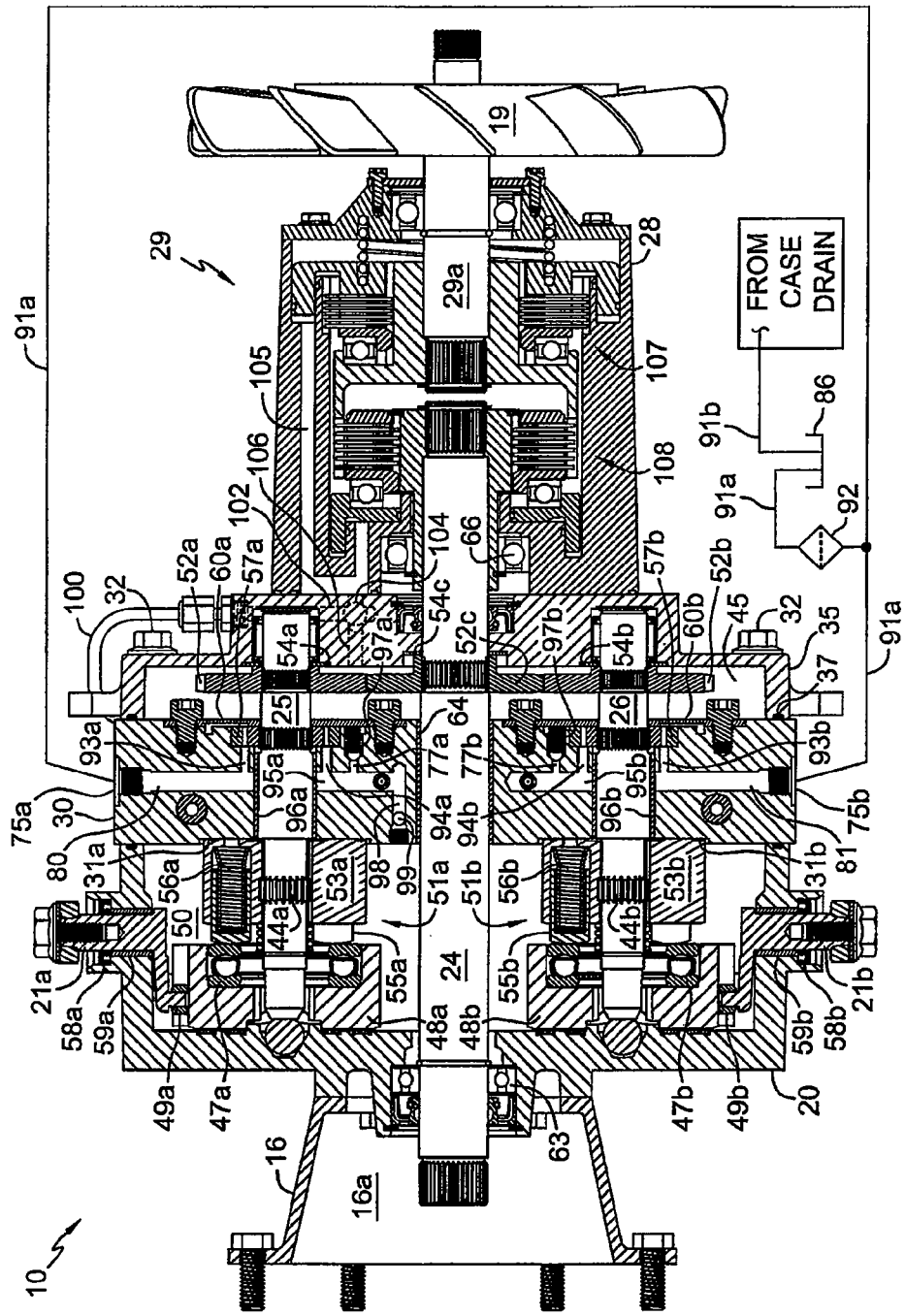
FIG. 6 is a cross-sectional view of the internal components of the dual pump arrangement shown in FIG. 4, along the lines 6-6 in FIG. 4, with certain parts shown as solid, and certain system elements shown schematically.
Figure 7:
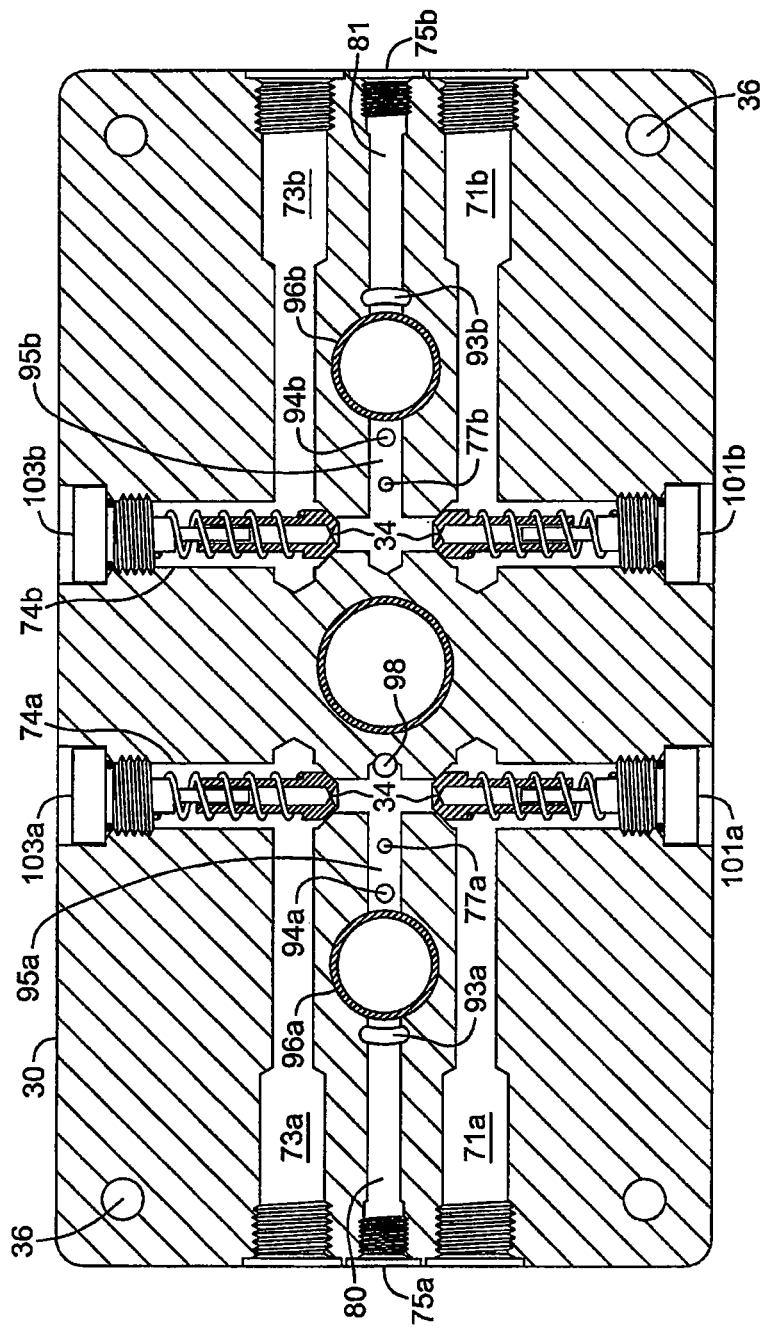
FIG. 7 is a cross-sectional view of the end cap of a first embodiment, along the lines 7-7 in FIG. 5.

A vehicle 12 employing a first embodiment of a dual pump unit 10 is shown in FIG. 1, while the external structure thereof is shown in FIGS. 4 and 5. The internal structure of dual pump unit 10 is shown in FIG. 6. While the hydraulic porting of end cap 30 is shown in FIG. 7, it will be understood that the drawings are not to scale, and the arrangement and sizing of the components will be obvious to a person of skill in the art. The size of pumps 51a and 51b and the other components will be dictated primarily by the intended applications of the unit and any required external dimensions.

FIG. 1 depicts a vehicle 12 incorporating a first embodiment of the present invention. The arrangement shown here is of a rear engine mounting, where engine 84 is mounted on vehicle frame 88, which also supports motors 90, mower deck 89 and other possible attachments. Axles 87 extend from motors 90 and drive vehicle wheels 85.

Pump housing 20 is mounted by way of bell housing 16 to engine 84 so that pump housing 20 is generally parallel to vehicle frame 88 and end cap 30 is perpendicular to vehicle frame 88. Attach points 18 formed on gear chamber cover or casing 35 may also be used to secure pump apparatus 10 to frame 88 in a number of known manners. Hydraulic hoses 70b and 72b carry fluid from threaded system ports 71 and 73 to respective motors 90. Pump apparatus 10 is preferably located along the center line of the vehicle, i.e., along the center of the longitudinal axis of the vehicle parallel to and between members of frame 88. This location of pump apparatus 10 simplifies the arrangement and connections of the various hoses, linkage mechanisms and the like. One such advantage is that hoses 70 and 72 may be generally symmetrical in length and routing. This length symmetry includes having hoses 70 of one generally identical length and hoses 72 of a second generally identical length, or having hoses 70 and 72 being of one generally identical length. Note that while the aforementioned discussion relates to the preferable positioning of pump unit 10 on the vehicle center line, pump unit 10 may be positioned in other locations as need dictates.

Figure 2:
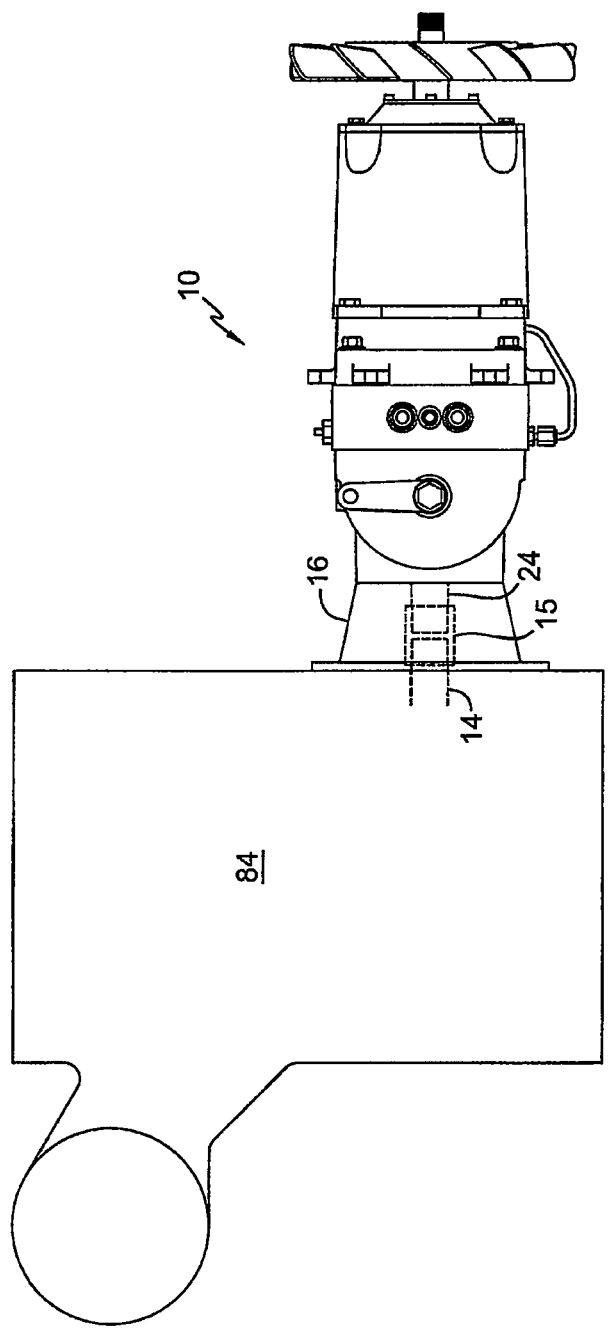
FIG. 2 is a side view of a first embodiment of this invention with certain internal elements shown in phantom to show one type of connection to the prime mover.
Figure 3:
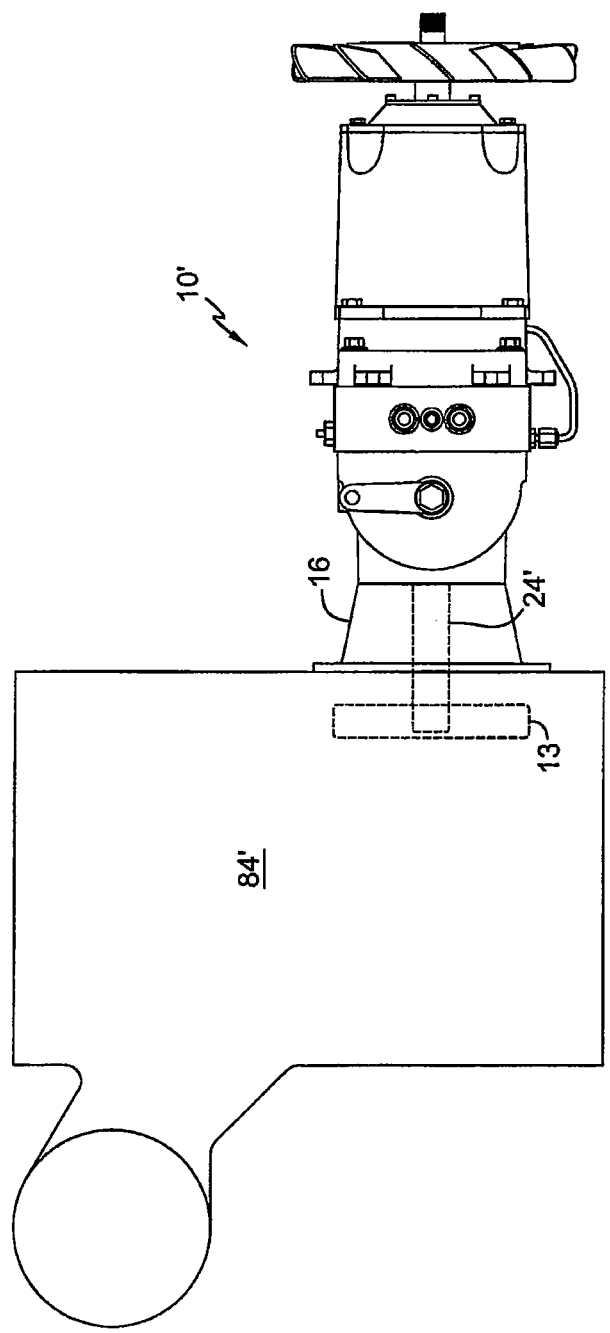
FIG. 3 is a side view of a first embodiment of this invention with certain internal elements shown in phantom to show another type of connection to the prime mover.

Bell housing 16 is positioned between and secured to both pump unit 10 and engine 84. In addition, as shown in FIG. 6, bell housing 16 forms an enclosed space 16a covering the coupling between main drive shaft 24 and engine 84. There are a variety of configurations for connecting main drive shaft 24 to a prime mover 84 output. One such configuration is depicted in FIG. 2, where an engine output shaft 14 is connected to a coaxially positioned main input shaft 24 by coupler 15. Another possible configuration is depicted in FIG. 3, where main input shaft 24' of pump apparatus 10' is connected to flywheel 13 of prime mover 84'.

Inside housing 20 is located a pump chamber (or cavity) 50 in which are mounted a first rotatable pump 51a and a second pump 51b, both of which are rotatably mounted on their respective running surfaces 31a and 31b on end cap 30 which forms a common support structure. End cap 30 is secured to housing 20 by fasteners 32, which also secure gear chamber cover 35 to end cap 30 and which extend through openings 36 in end cap 30 into threaded openings (not shown) in housing 20. End cap 30 acts to close off pump chamber 50.

The following discussion of pump 51a will also apply to second pump 51b. Pump 51a is of the axial piston design and comprises rotatable cylinder block 53a, in which are mounted a plurality of axial stick pistons 55a, each of which includes a piston spring 56a therein, with cylinder block 53a engaged to first pump shaft 25 by means of spline 44a or similar means. Pistons 55a abut a thrust bearing 47a mounted in swash plate 48a. Trunnion arm 21a interfaces with swashplate 48a through slider bearing 49a. Rotation of trunnion arm 21a thus moves swash plate 48a and will control the direction and flow rate of the output of hydraulic pump 51a. End cap 30 is preferably made of aluminum; it should be understood that materials such as cast iron may also be used and a valve plate may be used in conjunction with either material.

Figure 8:
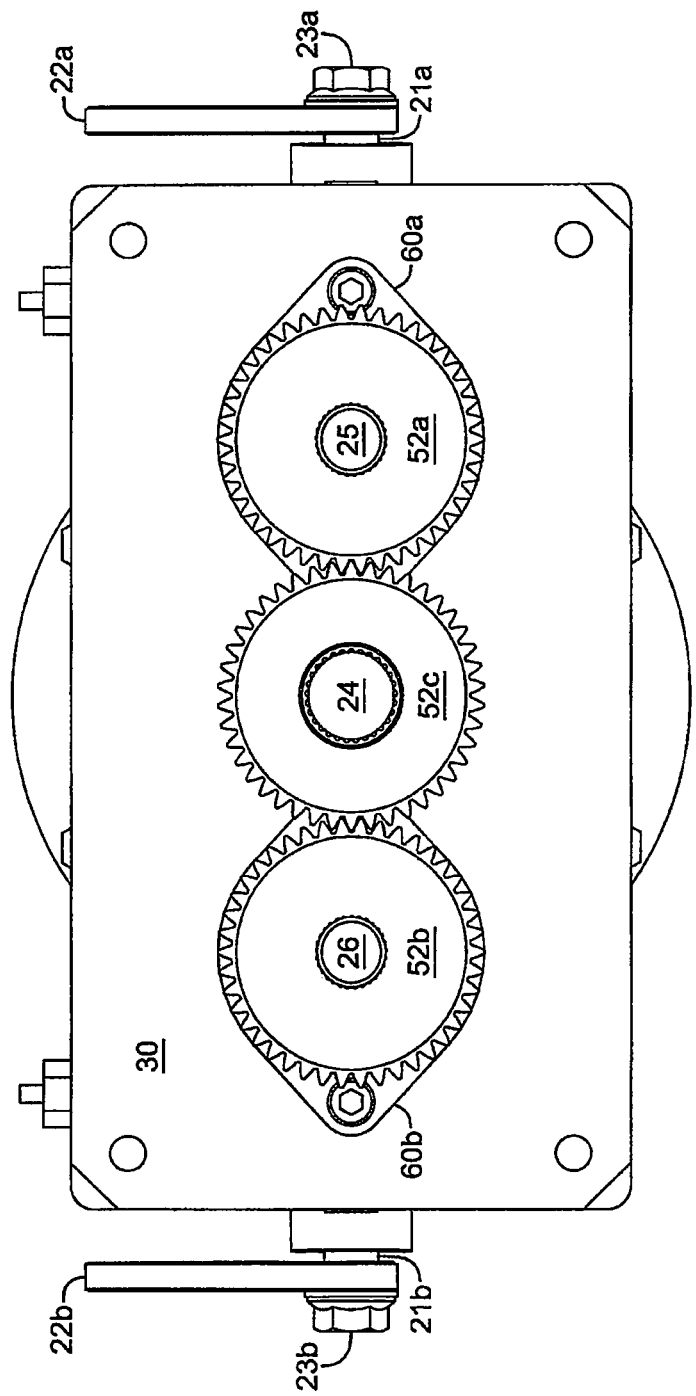
FIG. 8 is an end view of the dual pump design shown in FIG. 5 with the PTO and gear chamber cover removed.

Trunnion arm 21a extends out from housing 20 through seal 58a and bushing 59a. As shown in FIG. 8, control arms 22a and 22b are mounted to trunnion arms 21a and 21b with fasteners 23a and 23b. Control arms 22a and 22b can be engaged to various linkage mechanisms so that pumps 51a and 51b can be independently controlled by a vehicle operator. The location of trunnion arms 21a and 21b on opposite ends of housing 20 (corresponding to the sides of vehicle frame 88) permits the use of more efficient linkage systems 69 which include first and second operating levers.

Main drive shaft 24 is directly engaged to an engine or prime mover 84 on one end and drivingly engaged to pump shafts 25 and 26, as discussed in more detail below and as shown most clearly in FIGS. 2 and 6. For drivingly coupling main drive shaft 24 to pump shafts 25 and 26, a plurality of gear sets may be employed, which will be discussed in greater detail below. En this embodiment, the output of engine 84 is horizontal with respect to the ground, as are main drive shaft 24 and pump shafts 25 and 26.

Drive shaft 24 may also extend outside gear chamber cover 35 and drive a power take off unit or mechanism ("PTO") 29. PTO 29 may assume an engaged and disengaged position. In the engaged position, PTO shaft 29a will be coupled to drive shaft 24 and may be used to power an output device, such as a mower deck. In the disengaged position, PTO shaft 29a and drive shaft 24 will not be in driving communication with one another. PTO shaft 29a extends outside PTO 29 and, as shown in, e.g., FIGS. 1 through 6, a cooling fan 19 may be mounted on PTO shaft 29a. Therefore, when PTO 29 is engaged and drive shaft 24 is coupled to PTO shaft 29a drive shaft 24 will supply the driving force for PTO 29 and fan 19. It should be noted that PTO 29 and the corresponding extension of main drive shaft 24 through gear chamber cover 35 is optional; shaft 24 need not extend out in such a manner, in which case gear chamber cover 35 would be a solid structure on the end thereof.

PTOs are known in the art, so only minimal explanation of the function of PTO 29 will be provided herein. PTO 29 is attached to end cap 30 by a plurality of fasteners 67. Since PTO 29 as depicted is hydraulically controlled, a source of hydraulic fluid is required. In the embodiment shown in FIGS. 6 and 7, charge fluid from passage 94a is directed to charge gallery 95a and then through passage 98 to passage 99, to which is connected hydraulic line 100, shown in FIGS. 4 and 6. Line 100 is connected to passage 102 in gear chamber cover 35. Valve 104, which is operator controlled by one of a variety of known techniques, is used to activate and deactivate PTO 29. Valve 104 either provides pressurized fluid from passage 102 to PTO gallery 105, or it blocks fluid from passage 102 from entering into gallery 105 while relieving pressure from gallery 105. The fluid relieved from gallery 105 travels through passage 106, which is either connected to gear chamber 45 or pump chamber 50 by an internal or external connection.

When valve 104 is operated to provide pressurized fluid from passage 102 to gallery 105, PTO brake 107, which normally clamps PTO shaft 29a to PTO housing 28, is deactivated, thereby leaving PTO shaft 29a free to rotate. As PTO brake 107 is being deactivated, PTO clutch 108 is being activated, connecting main drive shaft 24 to PTO shaft 29a, thus causing PTO shaft 29a to rotate with shaft 24. When valve 104 is returned to a deactivated position pressure is released from gallery 105, allowing clutch 108 to be deactivated and brake 107 to be activated, uncoupling PTO shaft 29a from shaft 24 and braking PTO shaft 29a.

As shown in FIGS. 6 and 8, spur gears 52a, 52b and 52c acting as a first driving mechanism comprising a first drive train, which are preferably helical spur gears, are mounted in gear chamber 45, which may be sealed from pump chamber 50. Spur gear 52c is mounted on main drive shaft 24 and is directly engaged to spur gears 52a and 52b, which are mounted on shaft 25 and shaft 26, respectively. Gears 52a, 52b, and 52c are positioned by shoulders formed on their respective shafts and by proximity to washers 54a, 54b and 54c, which are located adjacent gear chamber cover 35. Shafts 25 and 26 in turn drive first and second pumps 51a and 51b, respectively.

Gear chamber 45 is formed by end cap 30 and gear chamber cover 35, which is secured to housing 20 through end cap 30 by a plurality of fasteners 32, as previously noted. A sealant, gasket, or o-ring 37 may be used at this junction to prevent leakage of hydraulic oil or gear grease. Main drive shaft 24 may be supported and located in a variety of locations, such as PTO 29 by sealed bearing 66, housing 20 by bearing 63, end cap 30 by bearing 64, or in gear chamber cover 35. Cooling fan 19 is secured to main drive shaft 24 by a spline and retaining ring (not shown) or may be secured by a number of other known configurations. An optional oil cooler (not shown) could also be added to the system and located to take advantage of the air flow from cooling fan 19. A seal may be positioned adjacent main drive shaft 24 between pump chamber 50 and gear chamber 45 so that different lubricants may be used in each chamber, such as oil in pump chamber 50 and grease in gear chamber 45.

As shown most clearly in FIG. 6, charge pumps 57a and 57b, which are gerotor style charge pumps, are mounted in end cap 30 and splined to pump shafts 25 and 26. Charge pumps 57a and 57b may be secured in end cap 30 by charge covers 60a and 60b. Kidney 93a provides oil from passage 80 to charge pump 57a. As shown in FIGS. 6 and 7, pressurized oil is sent from charge pump 57a to charge gallery 95a through passage 94a. Charge relief opening 77a is also formed in charge gallery 95a to permit oil to be discharged therethrough by means of charge relief valve 97a in the event of excess oil pressure.

The hydraulic porting in end cap 30 is shown in FIG. 7. System ports 71 and 73 extend into end cap 30, with ports 71a and 73a in communication with first pump 51a and ports 71b and 73b in communication with second pump 51b. A set of check valves 101a, 101b, 103a and 103b is threaded into respective openings 74a and 74b in end cap 30, corresponding to ports 71a, 71b, 73a and 73b. Check valves 101a, 101b, 103a and 103b are of a standard design known in the art, and each may include a bleed 34 formed in the end thereof. Check valves 101a and 103a are in communication with pump 51a, while check valves 101b and 103b are in communication with pump 51b.

When swash plate 48a is in the forward position, one of ports 71a or 73a will be under high pressure and the other port will be under low pressure, or vacuum. When swash plate 48a is moved to the neutral position, neither port will be under pressure, and when the direction of swash plate 48a changes (e.g., from forward to reverse) the status of ports 71a and 73a will switch, with the formerly low pressure or vacuum side being placed under high pressure, and vice versa. The ends of each system ports 71a, 71b, 73a, and 73b are threaded to permit connection of hoses 70 and 72 and the like.

As shown in FIG. 6, an external oil reservoir 86 may be mounted at various locations on vehicle 12 or on pump apparatus 10. Oil drains from pump chamber 50 through case drain 38, and then through outlet hose 91b to reservoir 86. Oil returns to the system through inlet hose 91a, passing through filter 92 into charge pump inlets 75a and 75b. As shown in FIG. 5, case drain 38 is located in housing 20 in a location corresponding to pump chamber 50, so that oil will drain from chamber 50 to reservoir 86 and will be passed through filter 92 before its return to the system. Filter 92 could also be located on hose 91b. Referring to FIG. 7, passages 80 and 81 are formed in end cap 30 and connected to charge inlets 75a and 75b. The location of passages 80 and 81 between system ports 71a and 73a allows for a compact end cap 30.

Bearing 96a, which is preferably a standard friction bearing, is used not only to support input shaft 25 but also to divide passage 80 into two separate sides, where inlet 75a and kidney 93a, which supplies oil from reservoir 86 to charge pump 57a, are on one side thereof, and passage 94a, which provides pressurized oil from charge pump 57a to charge gallery 95a, is on the other side. A similar bearing 96b is also used to support second shaft 26.

As noted above, pump chamber 50 and gear chamber 45 can be strictly segregated, such that the hydraulic oil used in pumps 51a and 51b is independent of the lubricant for spur gears 52a, 52b and 52c. This segregation would permit the use of a gear lubricant in gear chamber 45, which may be desirable in certain applications. It should be obvious to those with skill in the art that the foregoing arrangement may be varied without departing from the scope of the present invention.

Figure 9:
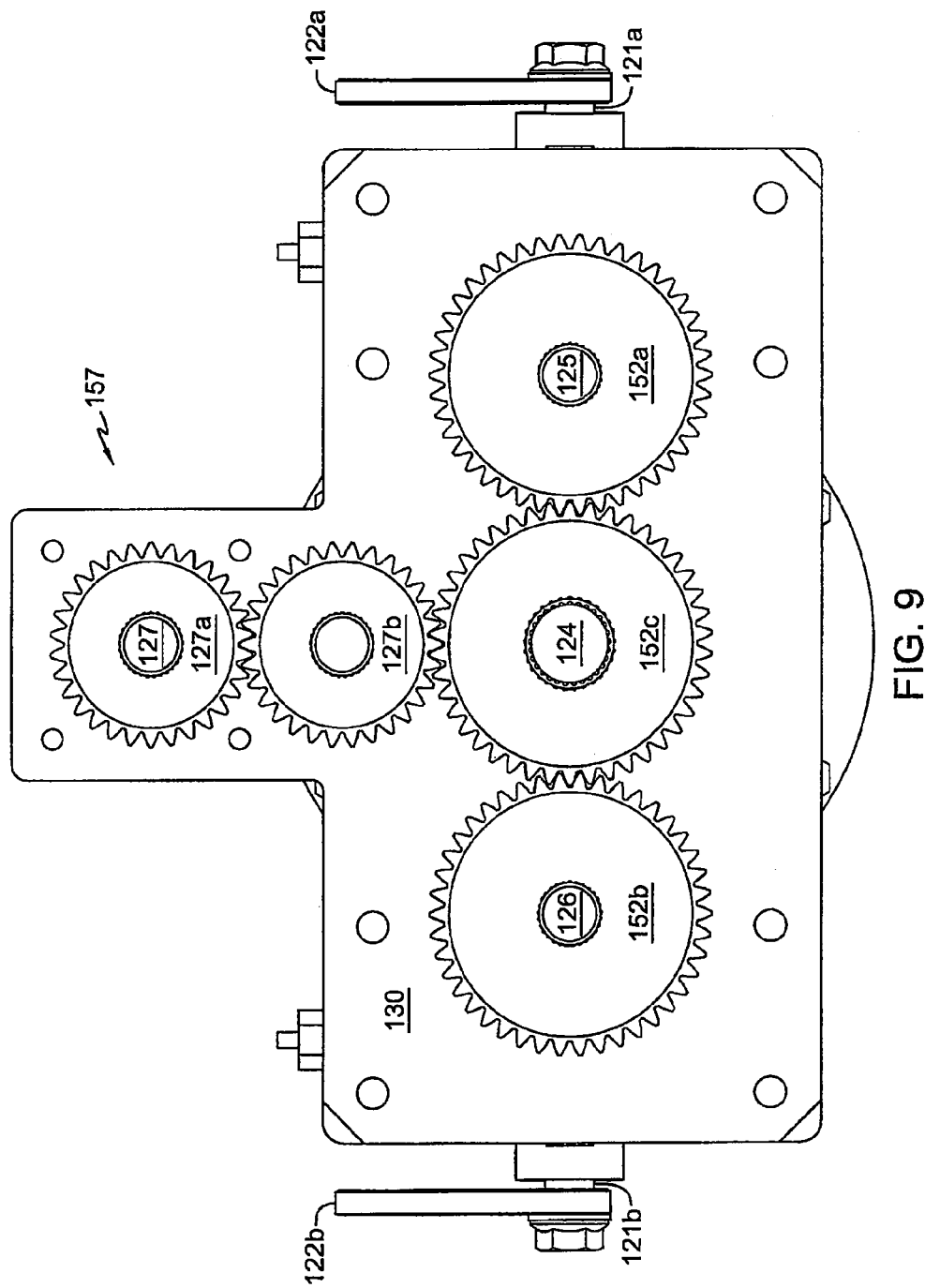
FIG. 9 is an end view of a second embodiment of this invention with the PTO and gear chamber cover removed.
Figure 10:
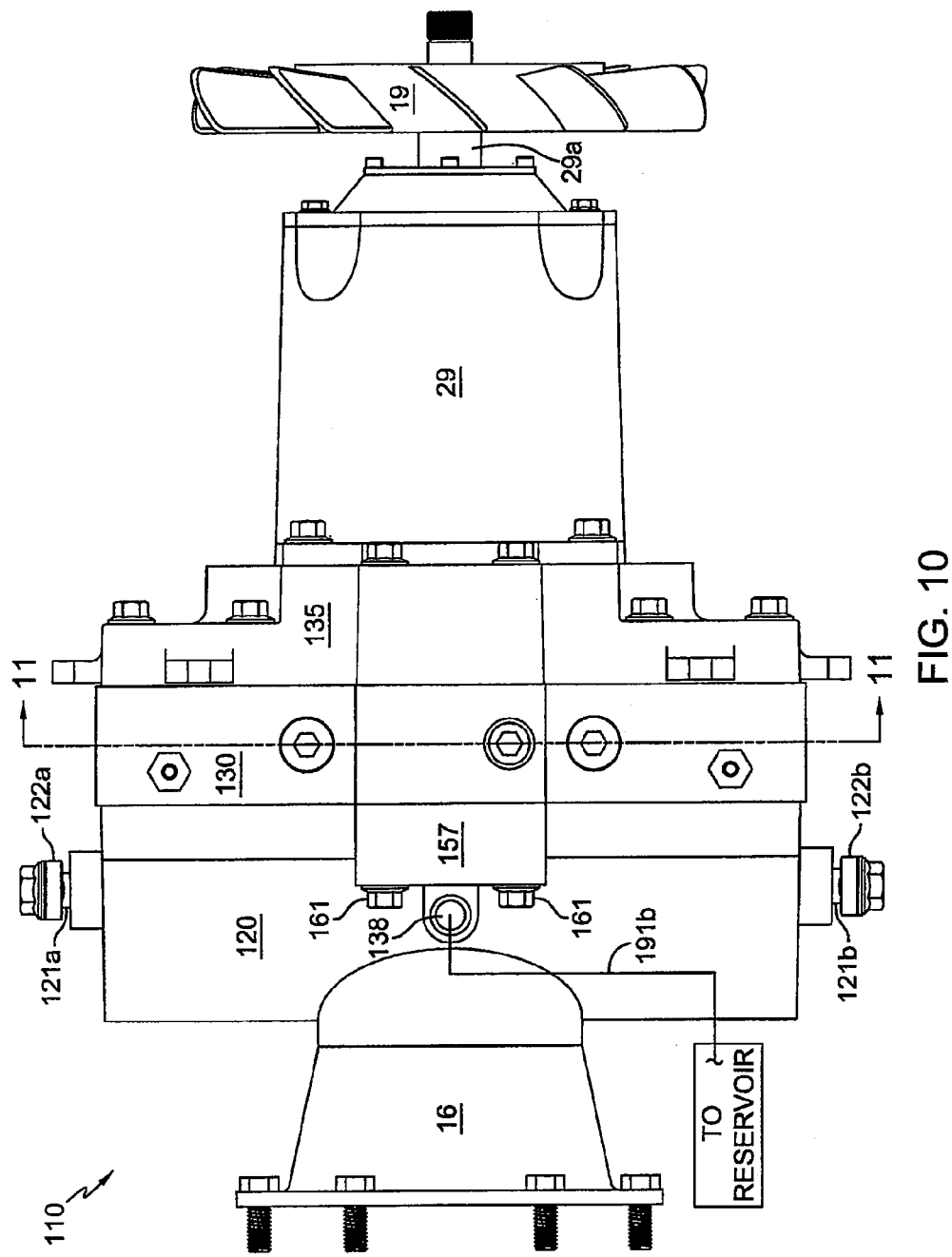
FIG. 10 is a top view of the dual pump and auxiliary pump design shown in FIG. 9.
Figure 11:
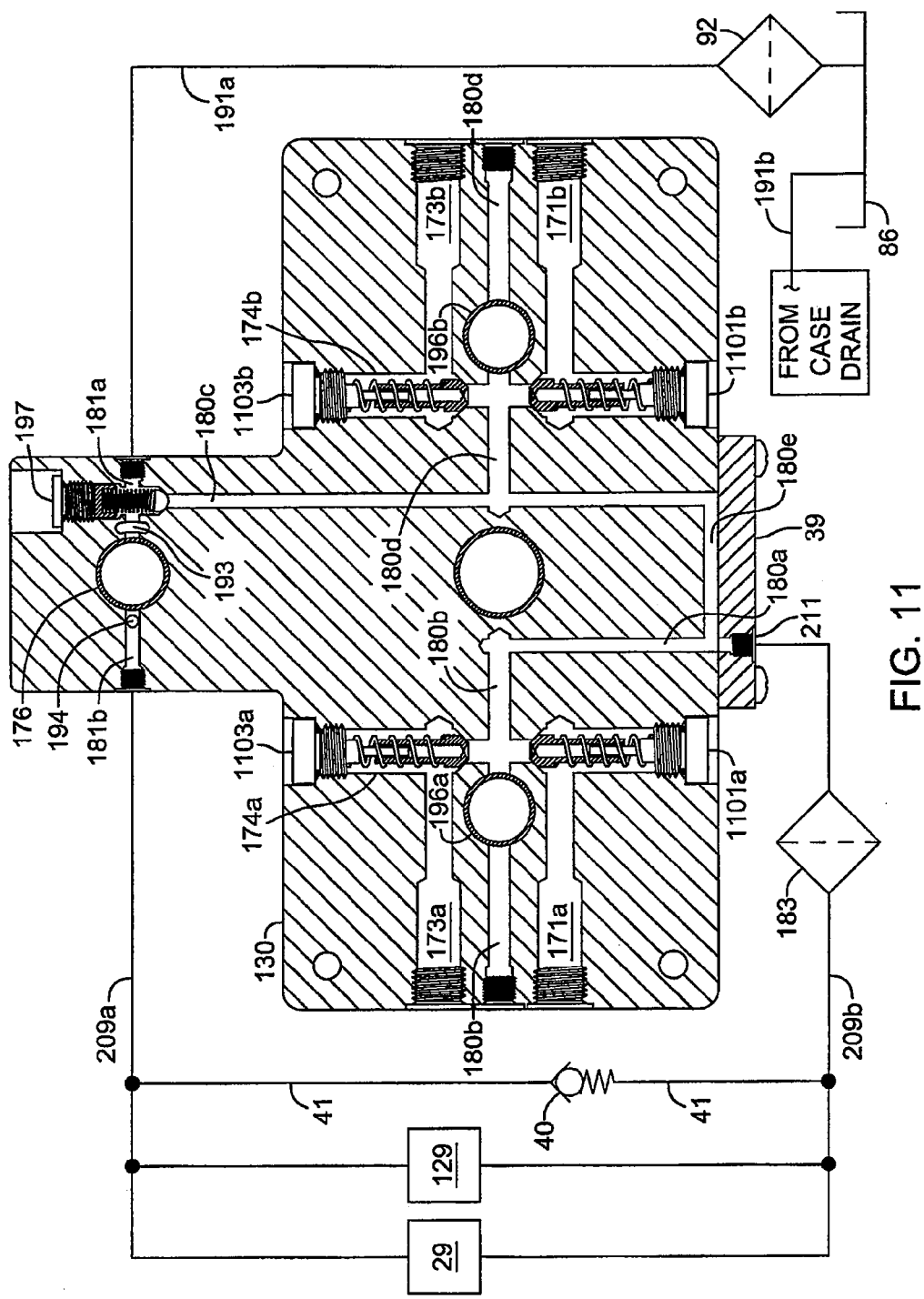
FIG. 11 is a cross sectional view of the end cap for the embodiment shown in FIG. 10, along lines 11-11, with certain system elements shown schematically.

A second embodiment of the present invention is shown in FIGS. 9-11. In this embodiment of pump apparatus 110, an auxiliary pump 157 has been provided in place of charge pumps 57a and 57b and auxiliary pump 157 may provide pressure for PTO 29. As shown in FIGS. 9 and 10, auxiliary pump 157 may be positioned above main drive shaft 124 and input shafts 125, 126 and attached to housing 120 by fasteners 161. The orientation of swash plates 48a and 48b and the location of trunnion arms 121a and 121b, control arms 122a and 122b and output system ports 171a, 171b, 173a and 173b can remain generally the same as in the previous embodiment, as exemplified in FIG. 11. As shown in FIG. 9, main drive shaft 124 may be drivingly engaged to pump shafts 125, 126 and auxiliary pump shaft 127. For driving auxiliary pump shaft 127, main drive shaft 124 may be coupled to gear 152c, which transfers the driving force from main input shaft 124 to gear 127b, then to gear 127a and then to auxiliary pump shaft 127. It should also be obvious to those with skill in the art that auxiliary pump 157 may also be positioned below gear 152c, approximately equidistant from the shafts 125 and 126 or may be positioned above or below shaft 125 or 126. However, the position shown is advantageous as it allows shafts 125 and 126 to be sized for the load of the pumps they drive and only shaft 124 carries the torque for more than one pump.

As shown in FIG. 10, trunnion arms 121a and 121b extend from opposite ends of housing 120. The addition of auxiliary pump 157 requires a different end cap 130. FIG. 11 shows as cross-section of end cap 130, taken along the lines 11-11 in FIG. 10. In this embodiment, system ports 173a and 171a correspond to pump 51a, and ports 171b and 173b correspond to pump 51b.

The charge and auxiliary pump configuration of this embodiment is different from that of pump apparatus 10,, which does not include an auxiliary pump. Fluid is drawn from reservoir 86 through filter 92 into charge inlet line 191a, which is connected to charge inlet passage 181a. Passage 181a is a portion of passage 181 that is formed through end cap 130 and then separated into charge inlet passage 181a and charge outlet passage 181b by the insertion of bearing 176.

As is known in the industry, fluid is then drawn from charge inlet passage 181a through charge inlet kidney 193 by auxiliary pump 157, which then provides pressurized fluid through outlet passage 194 into auxiliary outlet 181b. Auxiliary pump 157 may be a gerotor type pump or similar pump. From auxiliary outlet 181b pressurized fluid travels through auxiliary line 209a to PTO 29 or to another hydraulic auxiliary device 129, which may be a deck lift for deck 89, hydraulic actuators for moving swash plates 48a and 48b, or other hydraulically operated devices. Fluid may return from auxiliary device 129 or PTO 29 by way of auxiliary return line 209b. The returned fluid passes through filter 183 and re-enters end cap 130 through auxiliary return inlet port 211 formed in auxiliary cap 39.

Properly sized auxiliary pump 157 will provide more fluid than is necessary to operate auxiliary device 129. To allow the excess fluid to escape the auxiliary circuit, an auxiliary relief valve 40 is provided in auxiliary relief line 41 that is connected between outlet 181b of auxiliary pump 157 and auxiliary return inlet port 211. A person of skill in the art will understand that the location of auxiliary relief valve 40 shown is exemplary, as valve 40 may be located in a variety of locations, including passages formed internal to end cap 130. Filter 183 may similarly by located in a variety of locations, including internal to end cap 130, and in some configurations, filter 183 may not be required.

After entry through auxiliary return inlet 211, the fluid then enters a charge fluid gallery comprising gallery 180e, two passages 180a and 180c extending into end cap 130, and passages 180b and 180d formed at right angles to passages 180a and 180c. Passages 180b and 180d are machined or formed in end cap 130 and each is then divided into two portions by bearings 196a and 196b, respectively, and the openings to passages 180b and 180d at the surface of end cap 130 are plugged. Gallery 180e is preferably formed on a side of end cap 130 and closed off by auxiliary cap 39.

Pumps 51a and 51b may not require all the fluid available and a charge relief valve 197 is provided to limit the pressure in passages 180a, 180b, 180c, 180d and 180e. As shown, this relieved fluid returns to inlet 181a of auxiliary pump 157. However, for additional cooling the relieved fluid may be returned to reservoir 86.

As shown in FIGS. 10 and 11, any fluid that escapes into the internal sump of housing 120 is returned to reservoir 86 through case drain 138 and case drain line 191b.

System ports 173a and 173b are also formed at a generally right angle to intersect with check plug ports 174a and 174b, respectively, for ease of manufacture. This design permits the insertion of check plugs 1101a, 1101b and 1103a, 1103b into end cap 130 in the manner shown. This arrangement keeps check plugs 1101a, 1101b and 1103a, 1103b away from the fluid flow between pumps 51a and 51b and system ports 171a and 173a, and 171b and 173b, respectively. Being positioned between pumps 51a and 51b and system ports 171 and 173 would tend to reduce efficiency of pump apparatus 110. Having all of the required elements located in the same plane also decreases the required thickness of end cap 130.

This arrangement permits pump apparatus 110 to be mounted on vehicle frame 88 so that the axes of pumps 51a and 51b are parallel to the longitudinal axis of the vehicle. This design permits main drive shaft 124 to be directly driven by engine 84. This design eliminates the need for a separate belt and pulley, which decreases costs and increases the efficiency of the unit. Reservoir 86 may be secured to pump apparatus 110 or to vehicle frame 88 by a variety of known fastening mechanisms.

In this design, control arms 122a and 122b are mounted on the sides of housing 120 with respect to vehicle frame 88, which may increase the ease of connection with the various linkage mechanisms 69, depending on the structure of vehicle 12. As shown in FIG. 1, this arrangement also simplifies the connection of hydraulic hoses 70 and 72 from system ports 171a, 171b, 173a and 173b to motors 90.

Figure 12:
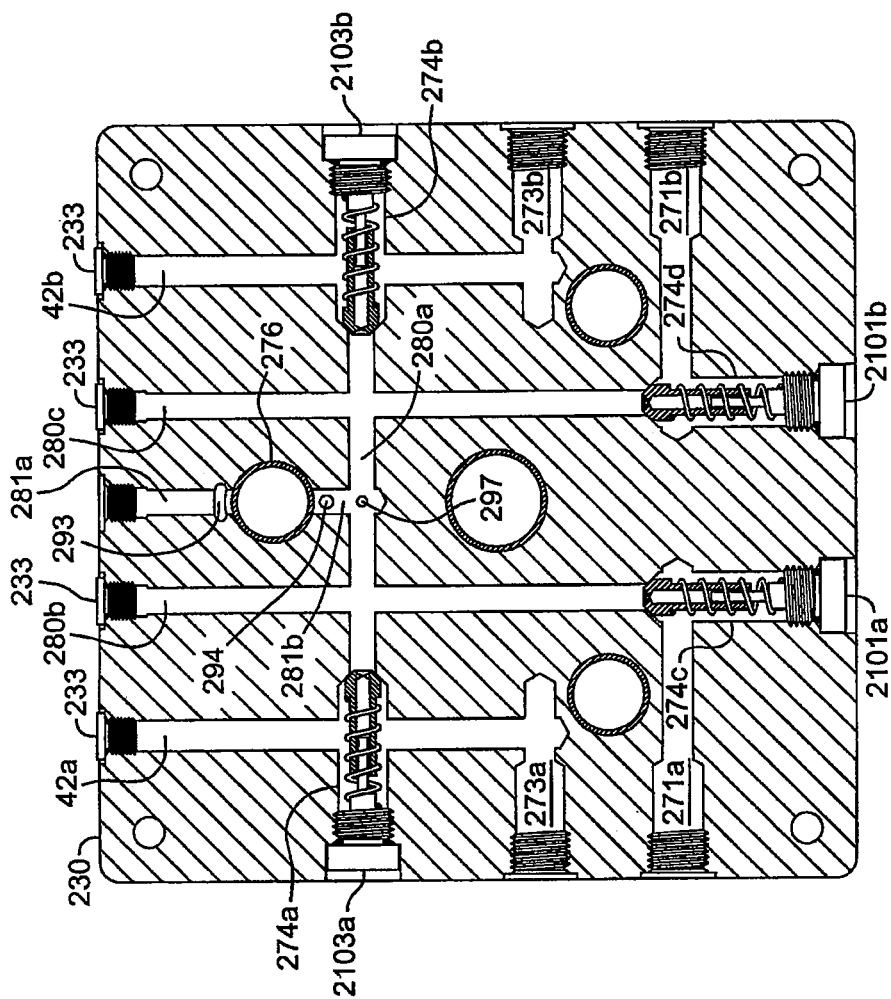
FIG. 12 is a cross-sectional view of an alternative end cap design for the embodiment shown in FIG. 11.
Figure 13:
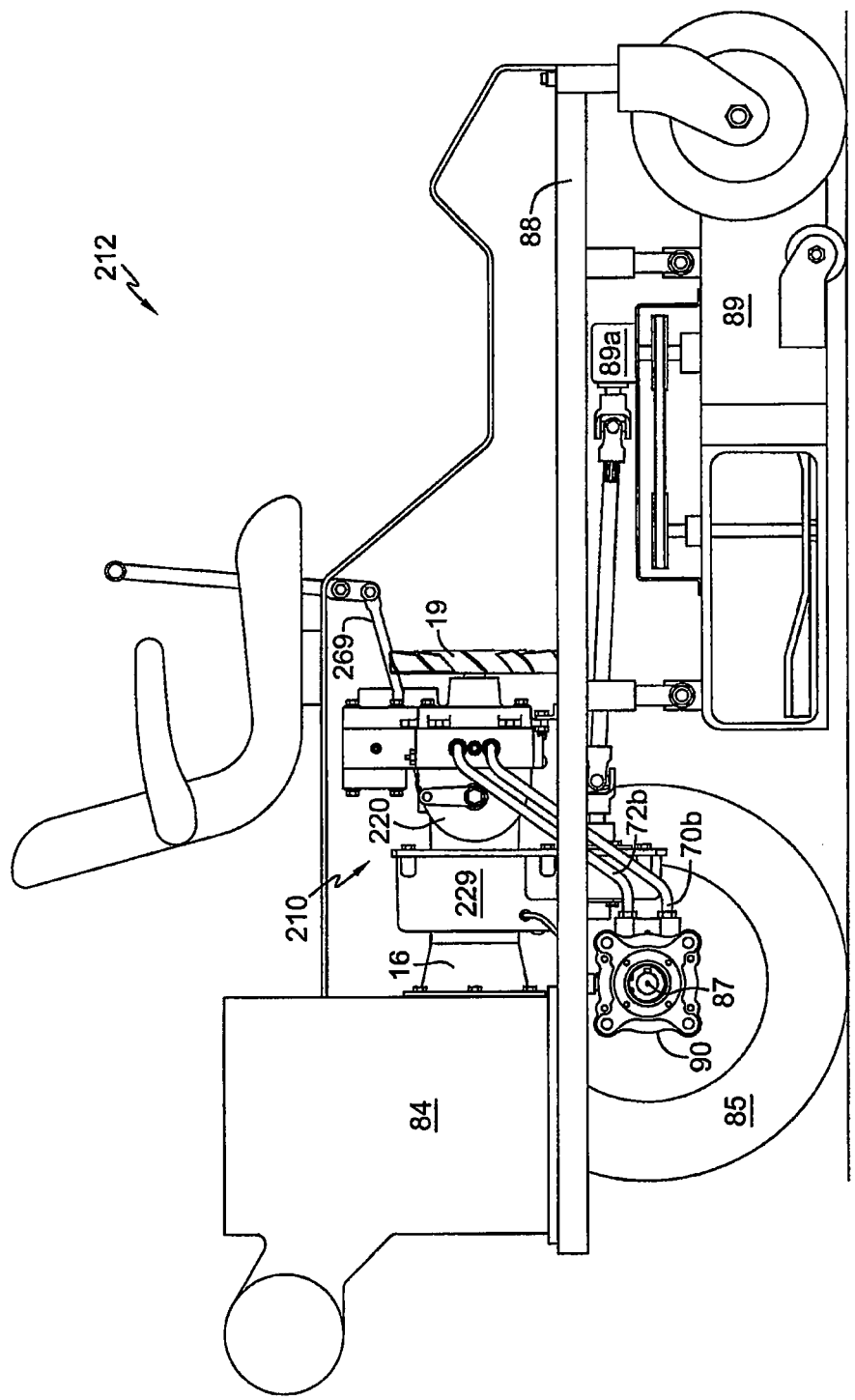
FIG. 13 depicts a vehicle employing a third embodiment of the drive assembly of the present invention with one wheel removed for clarity.
Figure 14:
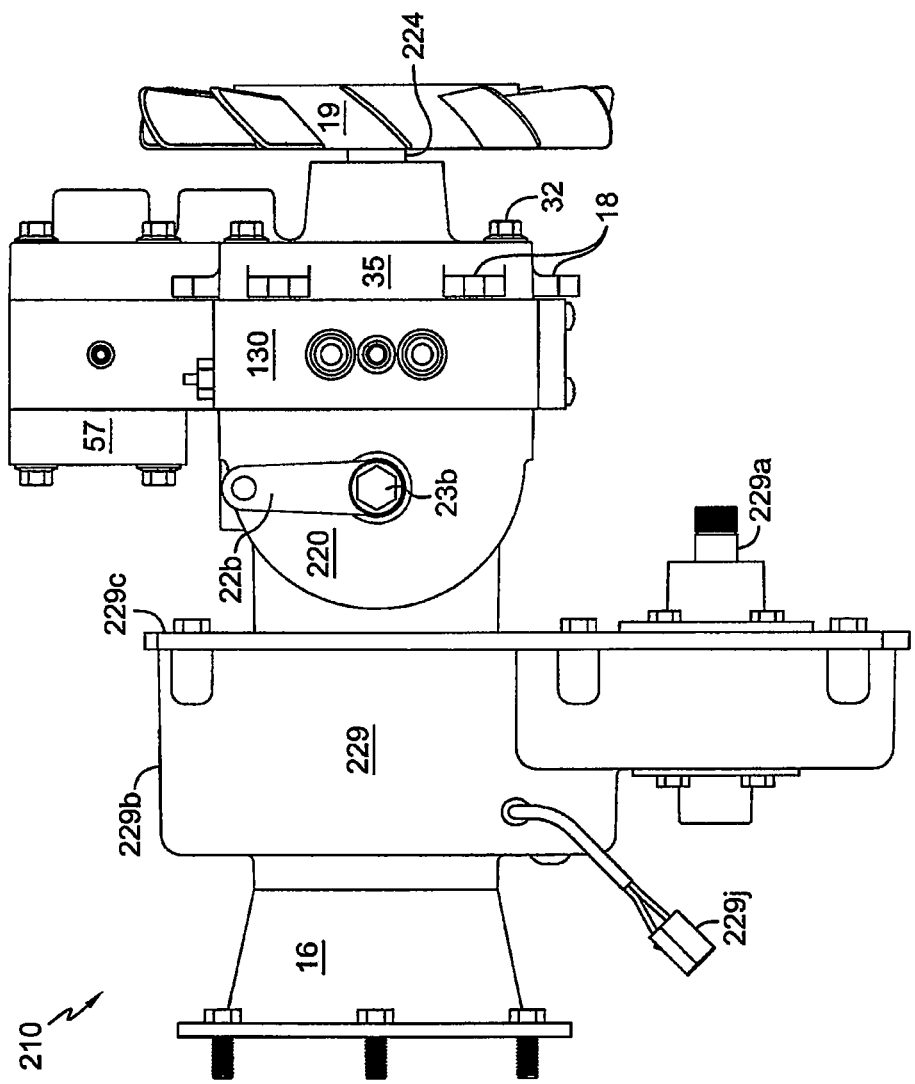
FIG. 14 is a side view of the embodiment of the invention shown in FIG. 13.
Figure 15:
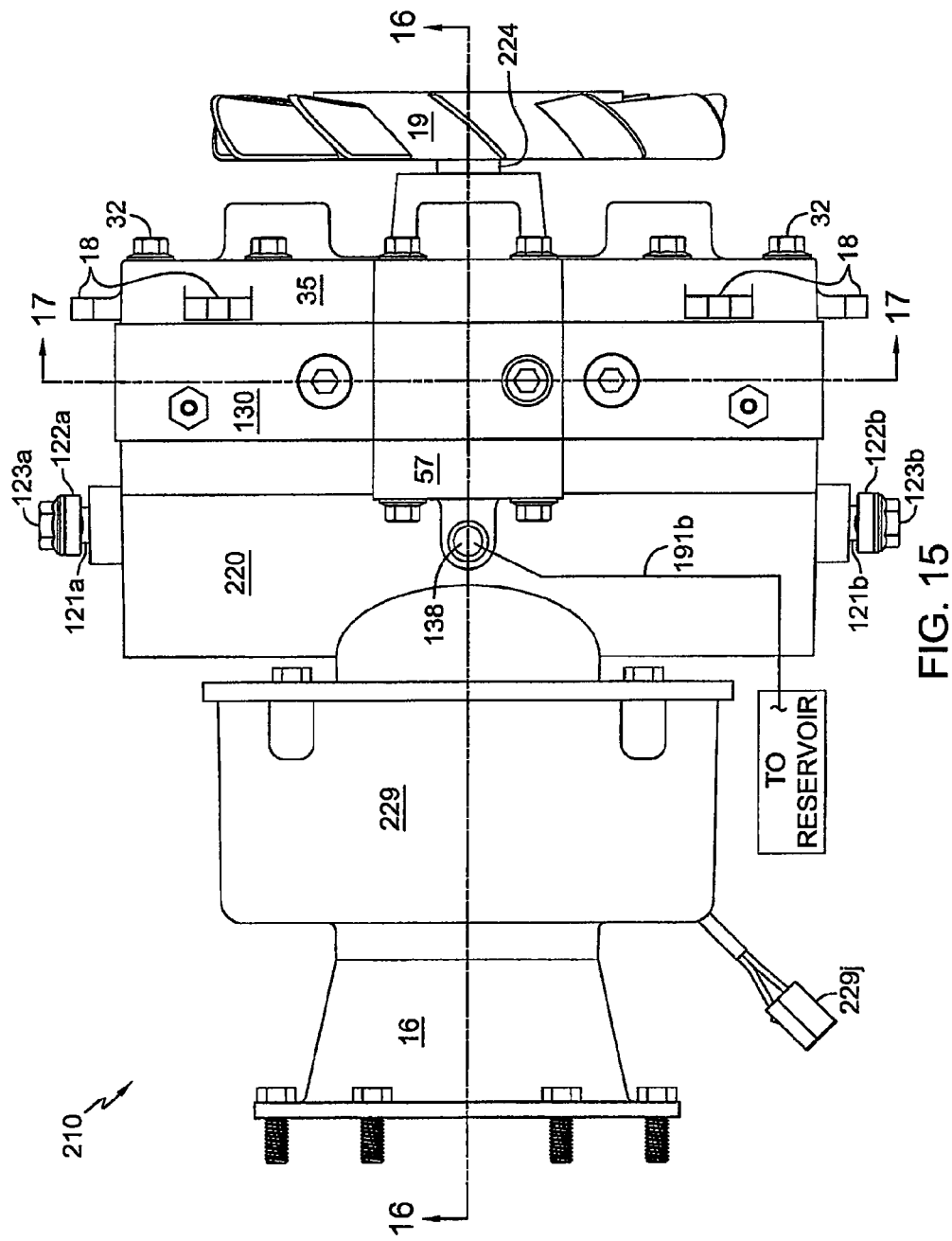
FIG. 15 is a top view of the embodiment of the invention shown in FIG. 13.
Figure 16:
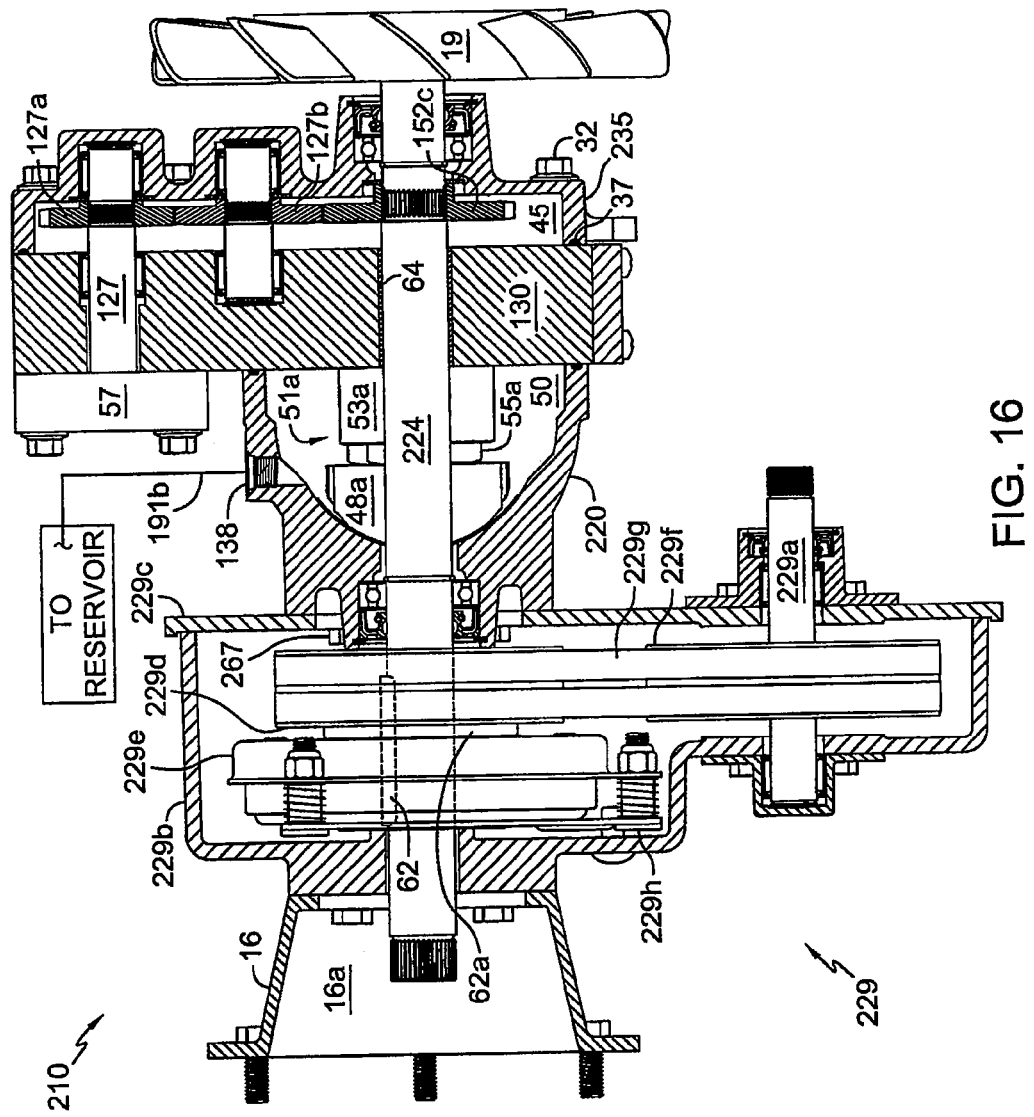
FIG. 16 is a cross-sectional view of the internal components of the dual pump arrangement shown in FIG. 15 along the lines 16-16 in FIG. 15, with certain parts shown as solid.
Figure 17:
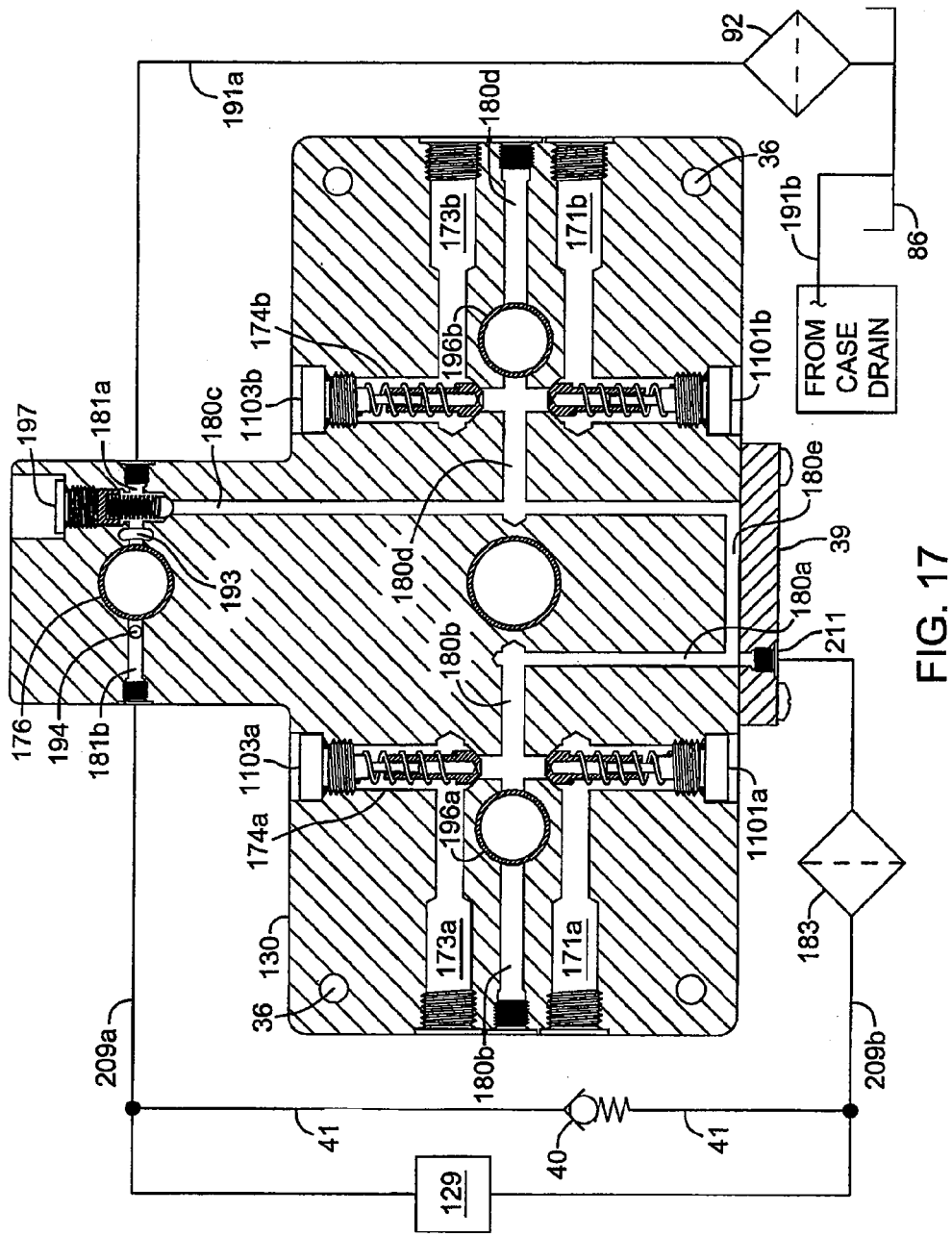
FIG. 17 is a cross-sectional view of the end cap shown in FIG. 16, along the lines 17-17 in FIG. 16.
Figure 18:
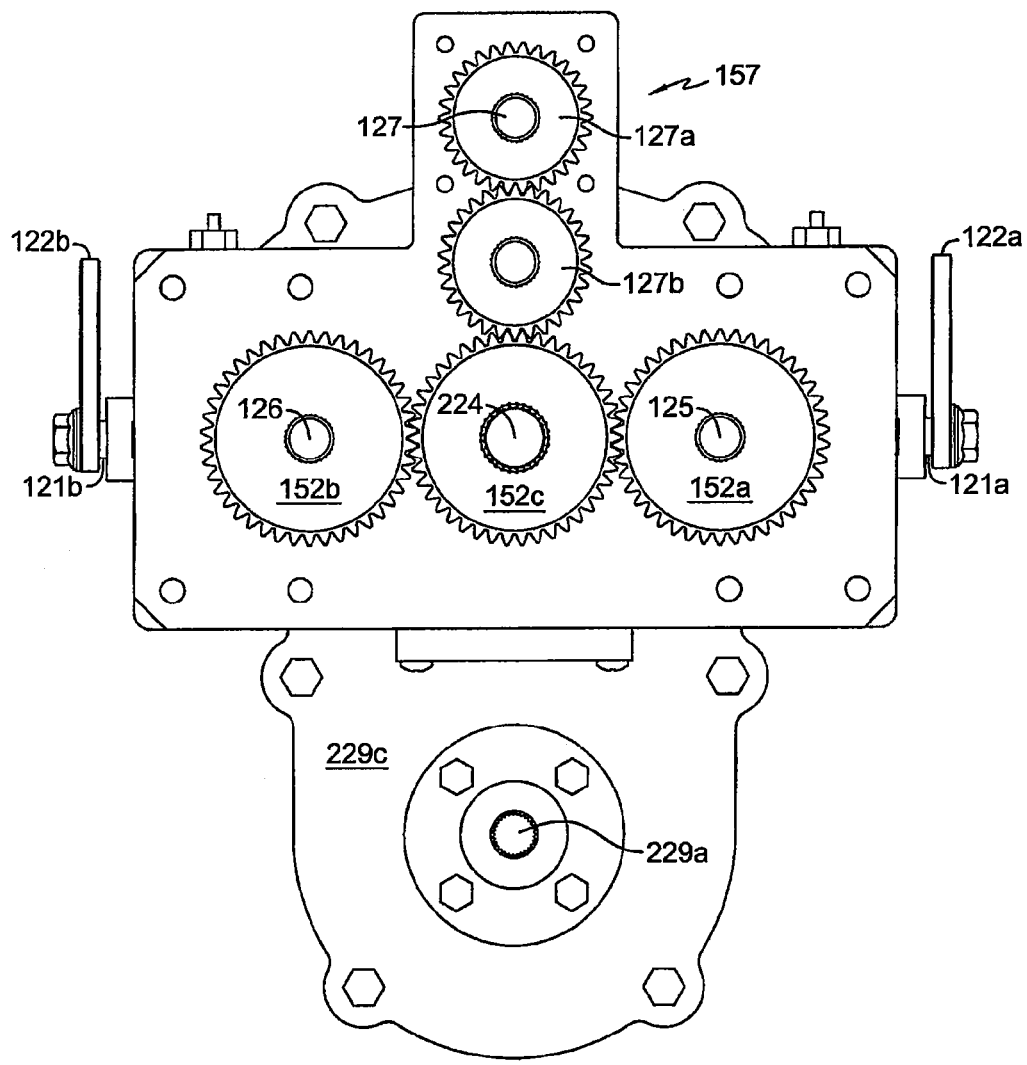
FIG. 18 is an end view of the third embodiment of this invention with the gear chamber cover and fan removed.
Figure 19:
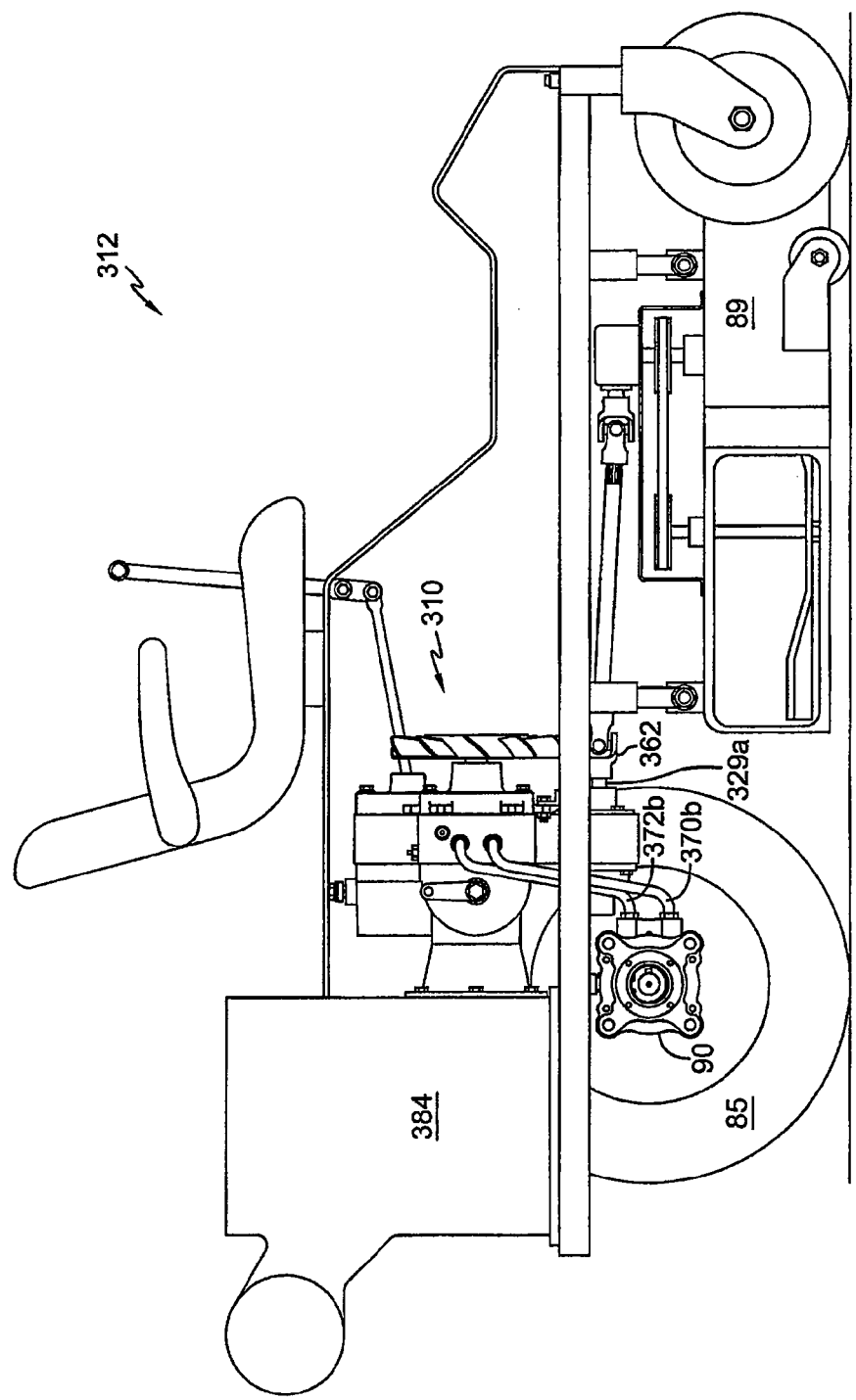
FIG. 19 depicts a vehicle employing a fourth embodiment of the drive assembly of the present invention with one wheel removed for clarity.
Figure 20:
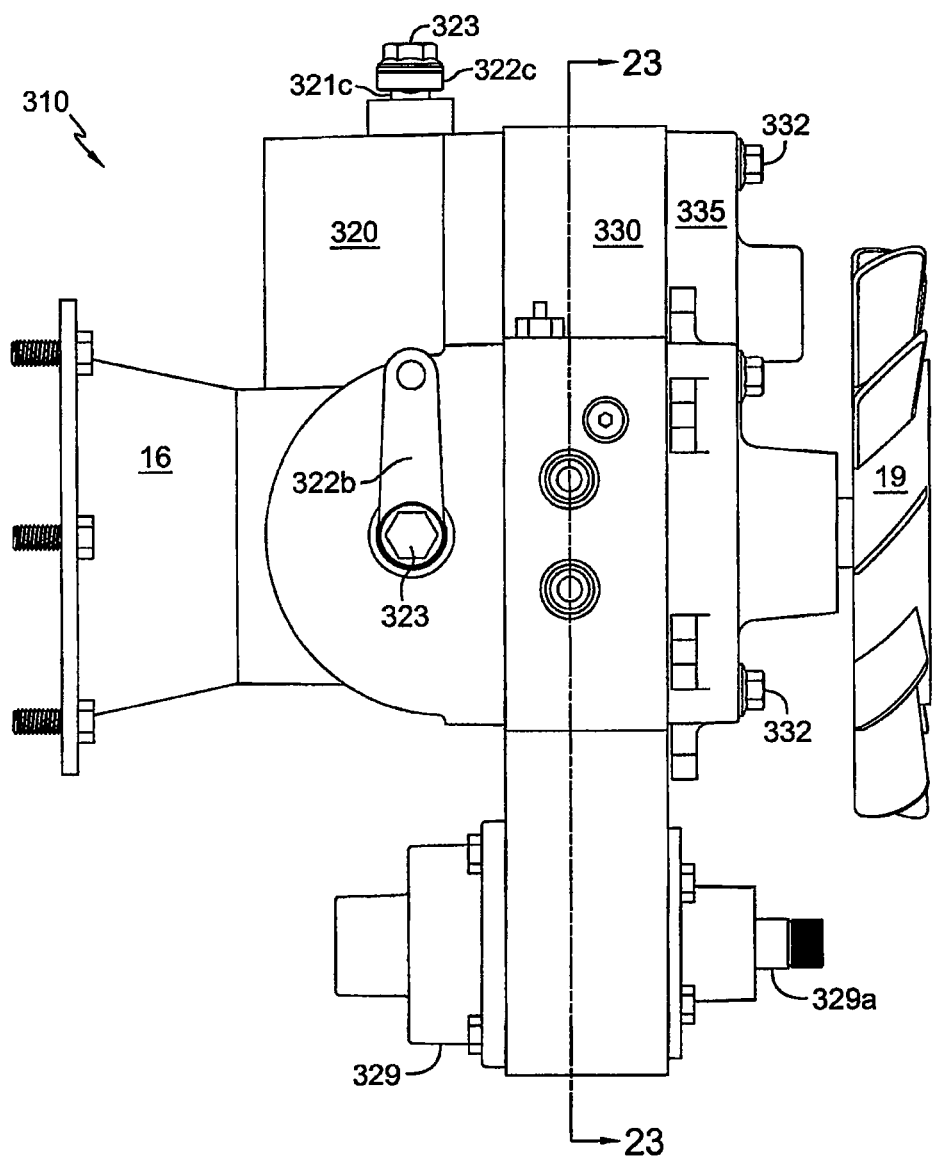
FIG. 20 is a side view of the fourth embodiment of this invention.

FIG. 12 shows a cross-section of another embodiment of this invention, where end cap 230 is similar in many ways to end cap 130 of FIG. 11. In this embodiment, a single charge pump (not shown) provides fluid to pumps 51a and 51b. System ports 271a and 273a correspond to pump 51a, and ports 271b and 273b correspond to pump 51b. The orientation of swash plates 48a, 48b and the location of trunnion arms 21a and 21b, control arms 22a and 22b and output system ports 271a, 271b, 273a and 273b would remain similar to that of the first two embodiments.

Fluid enters the charge pump from reservoir 86 through charge inlet 281a. From inlet 281a fluid passes through kidney-shaped opening 293 into the charge pump. The charge pump forces fluid through passage 294 into passage 281b, which is also the entry into charge gallery 280. Passages 281a and 281b are formed in a single operation and then separated by the insertion of bearing 276 into its bore. For convenience the opening to charge relief 297 is located in passage 281b, though it may be located at any position where it may communicate with charge gallery 280. Charge gallery 280 is formed by passage 280a extending between check plug 2103a positioned in port 274a and check plug 2103b positioned in port 274b, and passages 280b and 280c are formed at right angles to passage 280a and parallel with check plug 2101a positioned in port 274c and check plug 2101b positioned in port 274d. Passages 280b and 280c are then closed by plugs 233. Check plug 2103a is connected to system port 273a by connecting passage 42a. Similarly, check plug 2103b is connected to system port 273b by connecting passage 42b. Connecting passages 42a and 42b are closed at the edge of end cap 230 by plugs 233.

A third embodiment of the present invention is shown in FIGS. 13-18. Similar to the second embodiment of the present invention described above, this embodiment of pump apparatus 210 includes a main drive shaft 224 drivingly engaged to pump shafts 125, 126 and auxiliary pump shaft 127, which in turn drive pumps 51a and 51b and auxiliary pump 157, which may also be referred to as the first, second and third pumps or drive units respectively. The gearing connecting shafts 125, 126 and 127 (shown in FIG. 18) and the porting provided in end cap 130 (shown in FIG. 17) are also nearly identical to the gearing and porting described in connection with the second embodiment and shown in FIGS. 9 and 11, and are thus similarly numbered.

For powering a mower deck 89 or other auxiliary device a PTO assembly or PTO unit 229 may be positioned between bell housing 16 and pump housing 20. This embodiment is distinguishable from the pump apparatus described in the second embodiment and shown in FIG. 10, which discloses a PTO 29 that extends from end cap 130 and that includes an output shaft that is coaxial with the main drive shaft.

More specifically, PTO assembly 229 defines an enclosed space, which is formed by the combination of first member 229b and plate 229c. Assembly 229 is attached to housing 220 by fasteners 267. PTO assembly 229 contains a first pulley 229d that is selectively coupled to main drive shaft 224 by an electric clutch 229e acting as a power takeoff mechanism. Moreover, electric clutch 229e is selectively coupled to main drive shaft 224 by key 62. Electric clutch 229e is actuated by signals sent on electrical connector 229j. These signals may be generated by one of a variety of methods—for example, by operator actuation of a switch (not shown) mounted in vehicle 212. Once actuated, clutch 229e acts to selectively couple first pulley 229d to main input shaft 224 by means of a hub 62a. Other elements are likely to be included within power take off assembly 229, such as mounting and adjusting elements 229h. PTO 229 also includes an output shaft 229a, which may be drivingly coupled to mower deck input 89a for powering mower deck 89 and which may be positioned below main drive shaft 224. For driving output shaft 229a, first pulley 229d may be drivingly coupled to a second pulley 229f by belt 229g. By positioning output shaft 229a below main drive shaft 224, output shaft 229a and input 89a to mower deck 89 are displaced in a substantially collinear relationship. It should be understood that this arrangement provides for a more efficient transfer of power from output shaft 229a to mower deck input 89a and mower deck 89. Additionally, this arrangement keeps the components associated with deck drive in a location that provides room for other components, such as linkages and other drive line elements. It should be appreciated by those with skill in the art that electric clutches are common in the industry and that other variations of clutches may also be used to couple first pulley 229d to main drive shaft 224.

A fourth embodiment of the present invention is shown in FIGS. 19-24. In this embodiment of pump apparatus 310, a hydraulic motor 329 has been positioned below main drive shaft 324. Motor 329, which may be a piston motor, a gerotor, a geroller or other design, drives output shaft 329a, which acts as a power take off shaft. Since this embodiment allows u-joint 362 and output shaft 329a to be positioned in a substantially collinear relationship to one another, the location of motor 329 below main drive shaft 324 simplifies the arrangement of output shaft 329a with respect to mower deck 89 and provides for a more efficient transfer of power from motor 329 to mower deck 89. Although motor 329 is depicted as being positioned below the main drive shaft 324, motor 329 may also be positioned in other locations as need dictates.

Pump chamber 350 is formed in housing 320 between end cap 330 and gear chamber cover 335. A plurality of rotatable pumps, including a first rotatable pump 351a, a second rotatable pump 351b (not shown), and an auxiliary pump 351c are mounted in pump chamber 350. The two primary rotatable pumps 351a and 351b operate the same as pumps 51a and 51b, described above, to provide output for the vehicle. Auxiliary pump 351c preferably operates in a similar manner, but as will be described below, the output of auxiliary pump 351c is used to power motor 329. End cap 330 may be secured to housing 320 by fasteners 332, which also secure gear chamber cover 335 to end cap 330.

Trunnion arms 321a and 321b are located and operate similarly to trunnion arms 21a and 21b described above. Although trunnion arm 321c also operates in a similar manner, it extends from the top of housing 320, and control arm 322c is mounted to trunnion arm 321c with fastener 323. The combination of trunnion arm 321c and control arm 322c operate to control auxiliary pump 351c.

Figure 22:
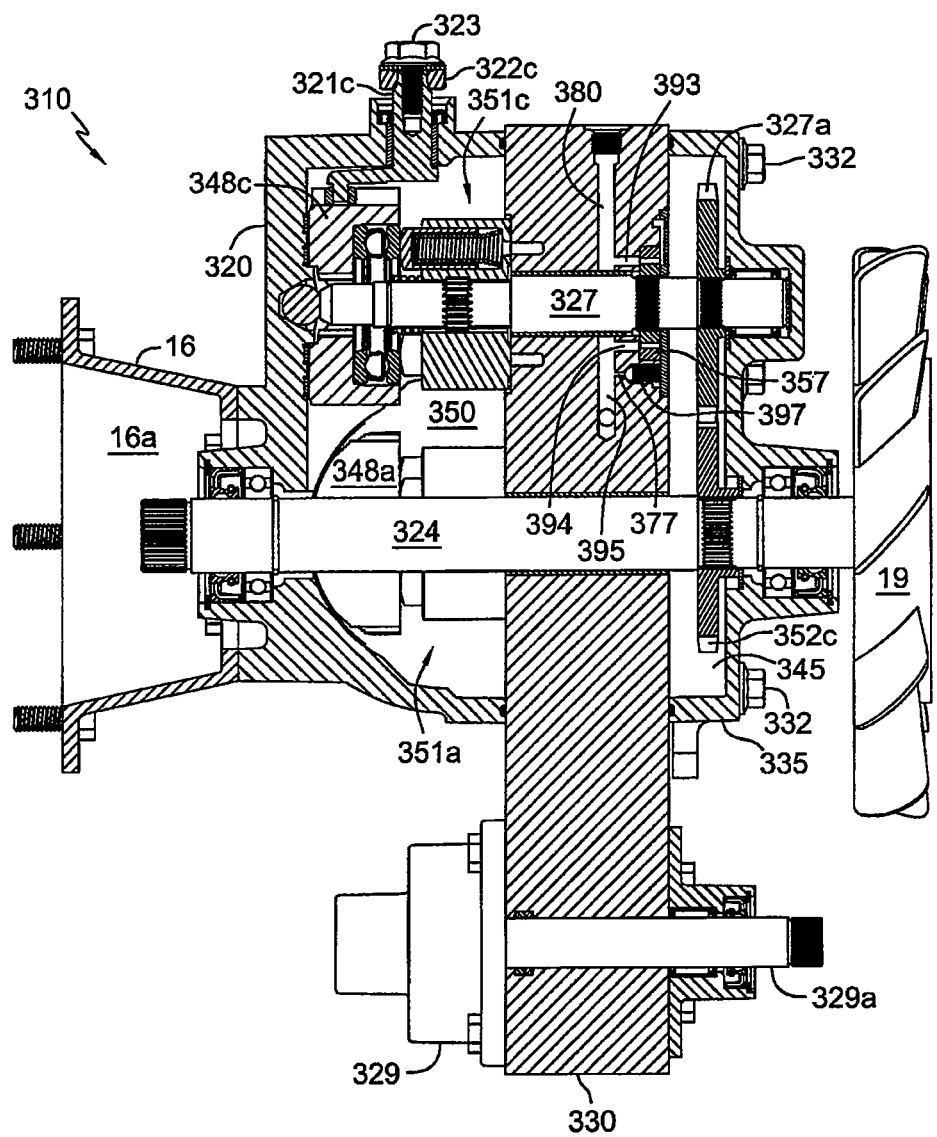
FIG. 22 is a cross-sectional view of the internal components of the dual pump arrangement shown FIG. 21 along the lines 22-22 in FIG. 21, with certain parts shown as solid.

As exemplified in FIG. 22 and similar to pumps 51a and 51b described above, pumps 351a and 351b may be horizontally positioned on each side of main drive shaft 324 which defines a plane of symmetry between the pumps 351a and 351b and driven by pump shafts 325 and 326 (not shown), which are drivingly connected to main drive shaft 324 via a plurality of gear sets. Although the second pump 351b is not shown in these figures, it should be appreciated by those with skill in the art that it is mounted on the pump mounting surface of end cap 330 in the same manner as pump 51b is mounted on end cap 30, which is shown in FIG. 6. For driving auxiliary pump 351c, driving force may be transferred from main drive shaft 324 and gear 352c to gear 327a, where gear 327a is also drivingly coupled to auxiliary shaft 327. Gears 352c and 327a are preferably helical spur gears and mounted in gear chamber 345 and act as a second driving mechanism comprising a second gear train. Gear chamber 345 and pump chamber 350 operate and are formed similarly to gear chamber 45 and pump chamber 50 described above.

Figure 23:
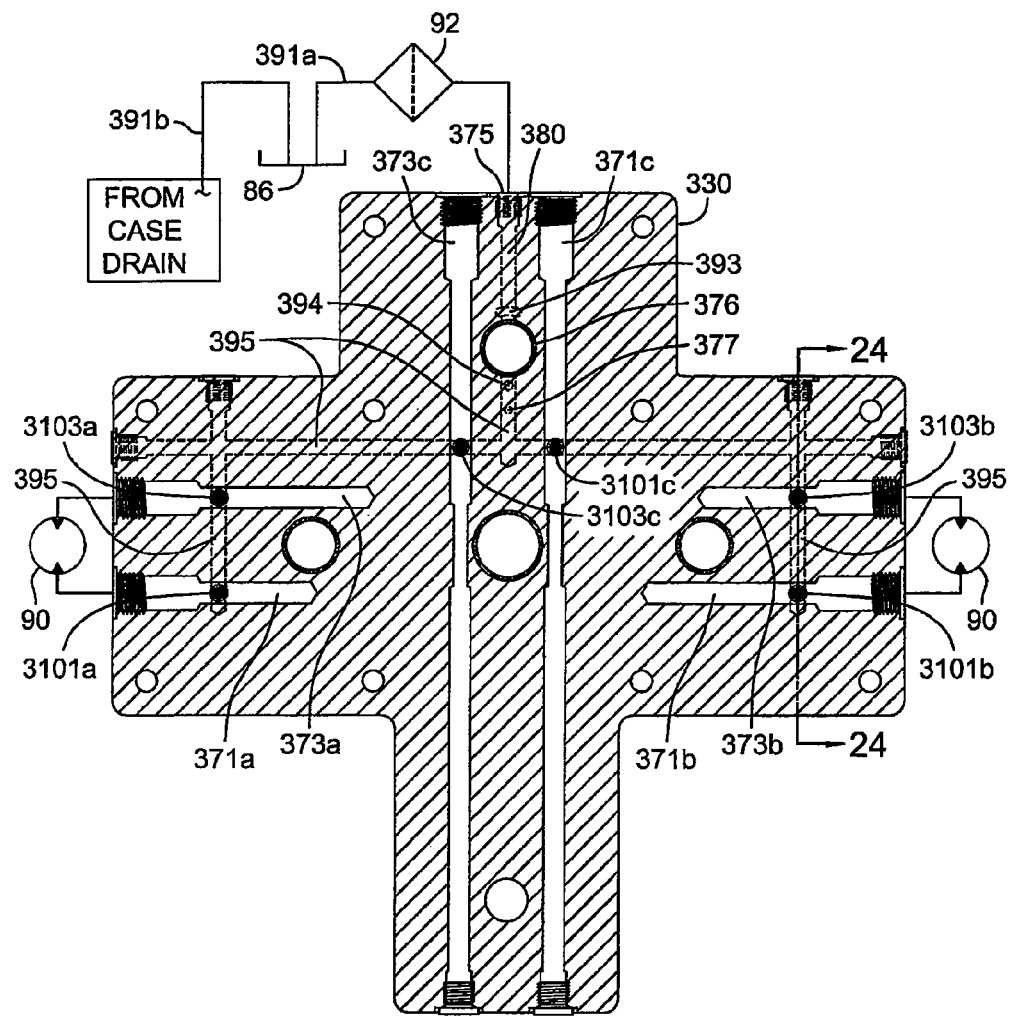
FIG. 23 is a cross-sectional view of the end cap of the fourth embodiment, along the lines 23-23 in FIG. 20, with certain system elements shown schematically.
Figure 24:
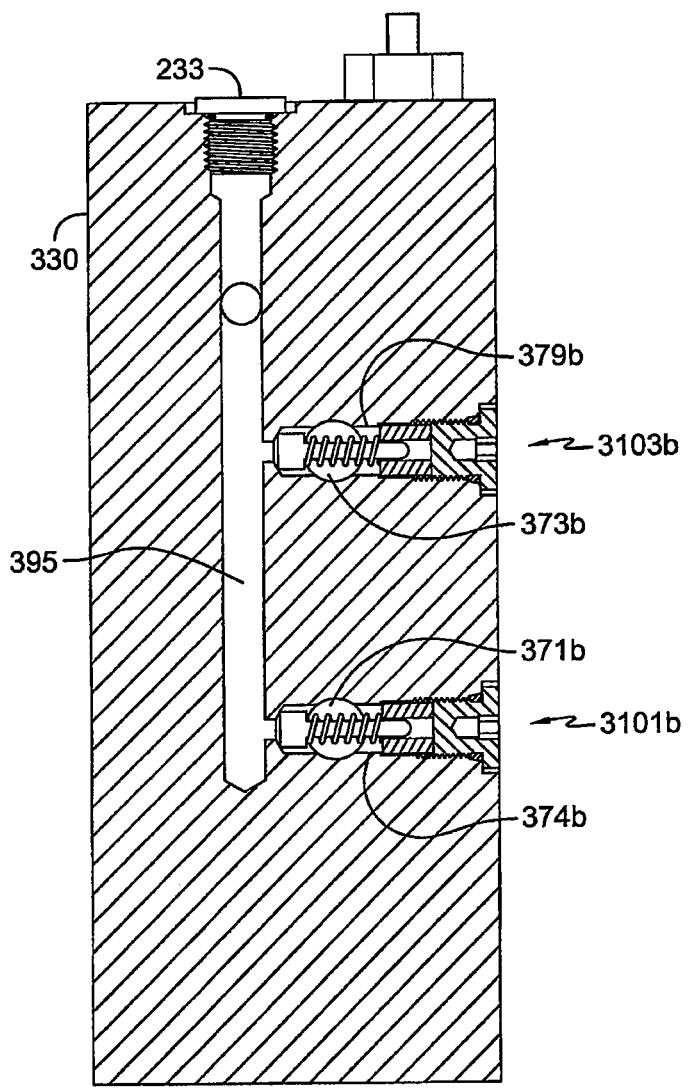
FIG. 24 is a cross-sectional view of the end cap shown in FIG. 23 along the lines 24-24 in FIG. 23.
Figure 25:
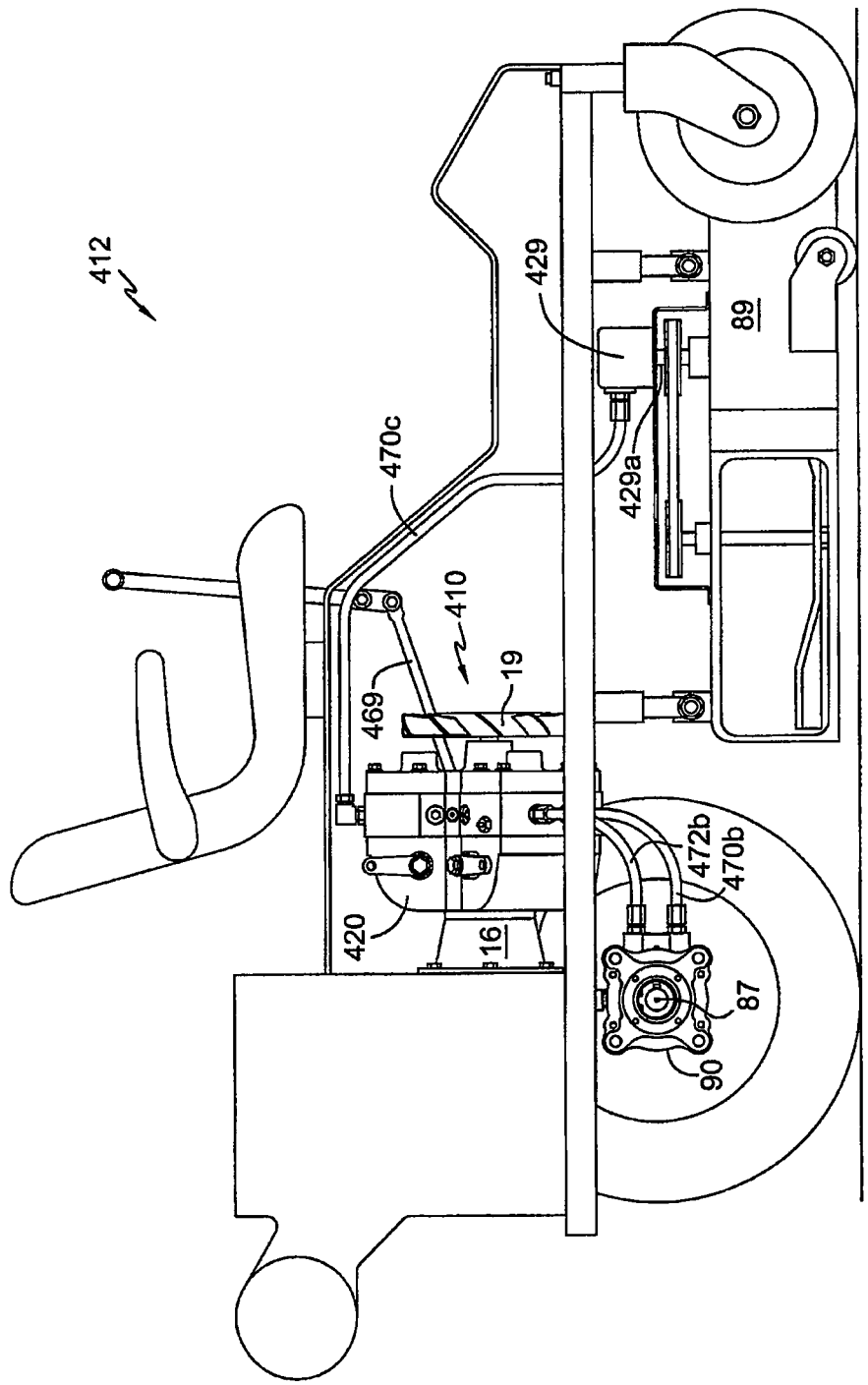
FIG. 25 is a vehicle employing a fifth embodiment of the drive assembly with one wheel removed for clarity.

As shown most clearly in FIG. 22 and similar to the embodiment depicted in FIG. 6, charge pump 357, which is a gerotor style charge pump, may be mounted in end cap 330 and splined to auxiliary shaft 327. Kidney 393 provides oil from passage 380 to charge pump 357. As shown in FIGS. 22 and 23, pressurized oil is sent from charge pump 357 to charge gallery 395 through passage 394. Charge relief opening 377 is also formed in charge gallery 395 to permit oil to be discharged therethrough by means of charge relief valve 397 in the event of excess oil pressure. Charge pump 357 supplies charge fluid to all three rotatable pumps 351a, b (not shown) and c, as shown in FIGS. 23 and 24.

For transferring driving force from main drive shaft 324 to output shaft 329a, end cap 330 includes hydraulic porting that connects auxiliary pump 351c to motor 329. As depicted in FIG. 23, which is a cross-sectional view of end cap 330 taken along lines 23-23 of FIG. 20, system ports 371 and 373 extend into end cap 330, with ports 371a and 373a in communication with first pump 351a, ports 371b and 373b in communication with second pump 351b, and ports 371c and 373c in communication with auxiliary pump 351c. A set of check valves 3101a-c and 3103a-c may be threaded into respective openings 374a-c and 379a-c in end cap 330, corresponding to ports 371a-c and 373a-c. As shown in FIG. 24, check valves 3101a-c and 3103a-c may be positioned substantially perpendicularly to the respective system ports 371a-c and 373a-c. Check valves 3101a and 3103a are in communication with pump 351a, check valves 3101b and 3103b are in communication with pump 351b, and check valves 3101c and 3103c are in communication with auxiliary pump 351c.

The pressure associated with each set of system ports 371a, 373a, 371b, 373b, 371c and 373c will be controlled by the positioning of the respective swash plate 348a, 348b (not shown) or 348c and operate in the same manner as ports 71a, 73a and swash plates 48a and 48b described above. The ends of each system ports 371a, 371b, 373a, and 373b are threaded to permit connection of hoses 370 and 372 and the like. Although system ports 371c and 373c are also threaded to permit connection of hoses and the like, system ports 371c and 373c extend into end cap 330 to hydraulically transfer driving force from auxiliary pump 351c to motor 329 and output shaft 329a, as shown in FIG. 23.

Figure 21:
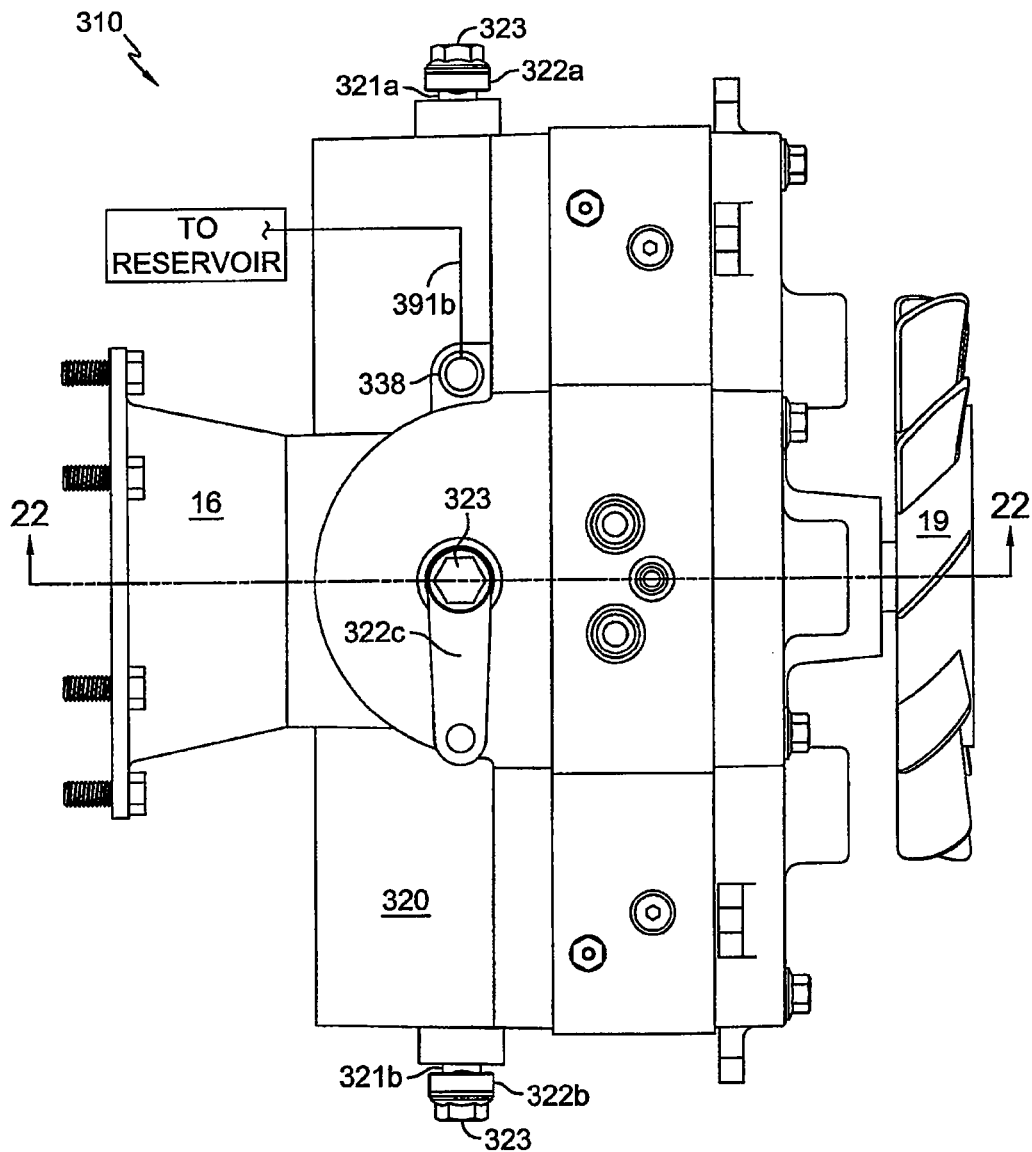
FIG. 21 is a top view of the fourth embodiment of this invention.

As exemplified in FIG. 23, an external oil reservoir 86 may be mounted at various locations on vehicle 312 or on pump apparatus 310. Oil may drain from pump chamber 350 through case drain 338, and then through outlet hose 391b to reservoir 86. Oil returns to the system through inlet hose 391a, passing through filter 92 into charge pump inlet 375. As shown in FIG. 21, case drain 338 is located in housing 320 in a location corresponding to pump chamber 350, so that oil will drain from chamber 350 to reservoir 86 and will be passed through filter 92 before its return to the system. Filter 92 could also be located on hose 391b. Referring to FIG. 23, passage 380 is formed in end cap 330 and connected to charge inlet 375. The operation of charge pump 357 to supply charge fluid to system ports 371a, 371b, 371c, 373a, 373b and 373c allows for a compact end cap 330.

Main drive shaft 324, pump shafts 325 and 326 (not shown), and auxiliary pump shaft 327 will operate and be supported in similar manners as main drive shaft 24 and pump shafts 25, 26, which are described in detail above, including using bearing 376 to support auxiliary shaft 327 and divide passage 380 into two separate sides. As with other embodiments of the present invention that are described herein, a cooling fan 19 may be secured to main drive shaft 324.

A fifth further embodiment of the present invention is shown in FIGS. 25-30. In this embodiment of pump apparatus 410, pump chamber 450, which is not shown but which would be similar to previously shown pump chambers, is formed in housing 420 and enclosed by end cap 430. A plurality of rotatable pumps, including a first rotatable pump 451a, a second rotatable pump 451b, and an auxiliary pump 451c, which are not shown but which would be similar to previously shown pumps, are mounted in pump chamber 450. The two primary rotatable pumps 451a and 451b operate the same as pumps 51a and 51b, described above, to provide output for the vehicle and drive wheel motors 90. Auxiliary pump 451c preferably operates in a similar manner, but as will be described below, the output of the auxiliary pump 451c is used to power motor 429. End cap 430 may be secured to housing 420 by fasteners 432, which also secure gear chamber cover 435 to end cap 430.

Trunnion arms 421a, 421b and 421c are not shown but would be similar to and operate similarly to trunnion arms 321a, 321b and 321c described above, and are positioned close to each of their respective pumps 451a, 451b and 451c. Control arms 422a (not shown), 422b and 422c are mounted to each respective trunnion arm 421a, 421b and 421c with fastener 423. The combination of trunnion arm 421c and control arm 422c operate to control auxiliary pump 451c.

Figure 26:
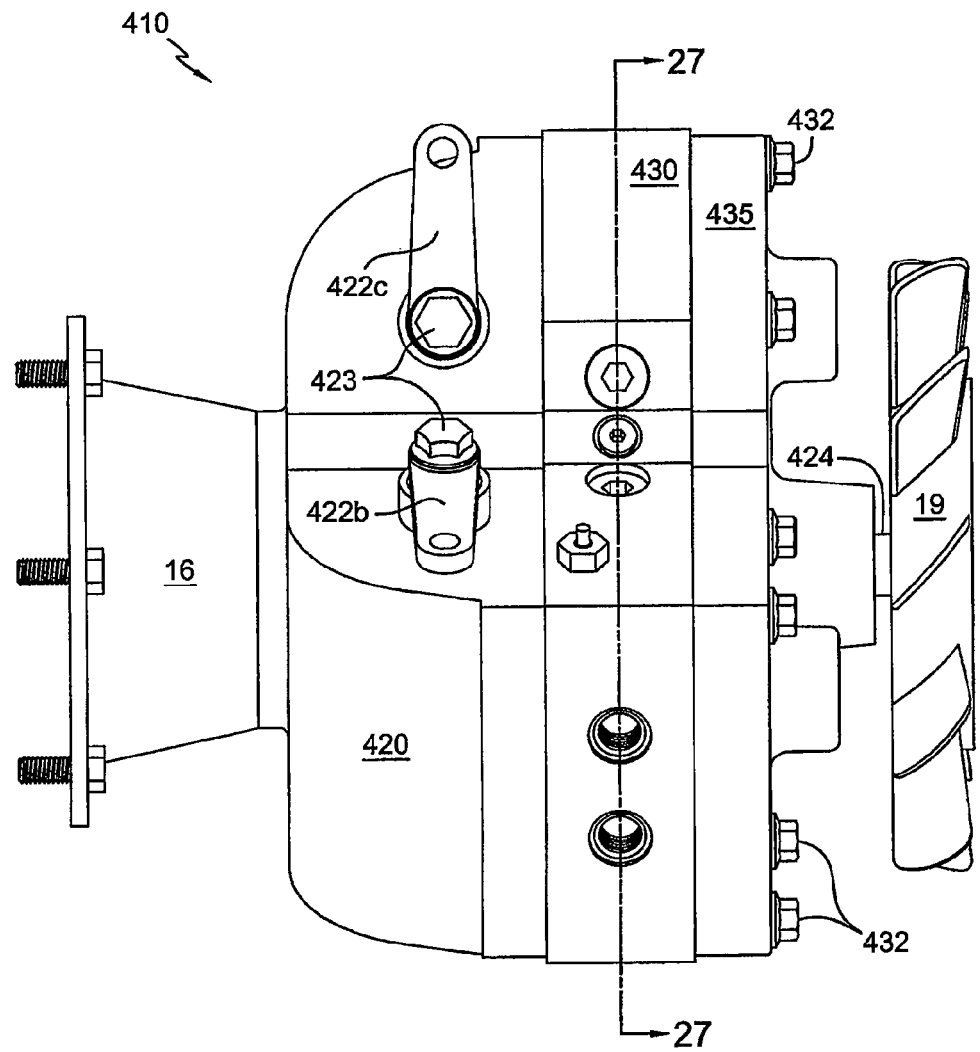
FIG. 26 is a side view of the fifth embodiment of this invention.
Figure 27:
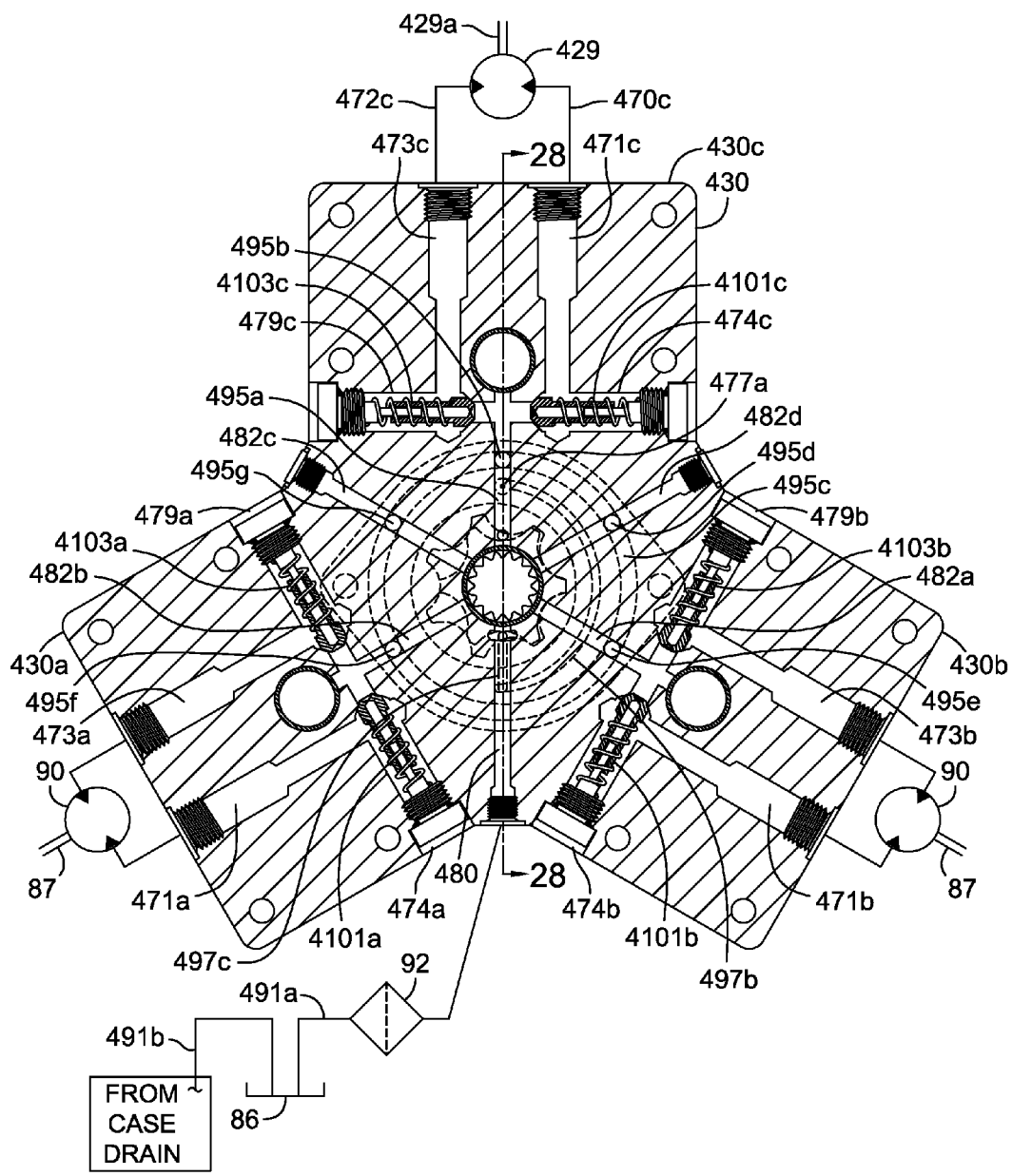
FIG. 27 is a cross-sectional view of the end cap of the fifth embodiment along the lines 27-27 in FIG. 26, with certain system elements shown schematically.

As exemplified in FIGS. 26 and 27, pumps 451a, 451b and 451c may be positioned around main drive shaft 424 and driver by pump shafts 425, 426 and 427, which are not shown, but which are similar to the shafts shown in the embodiment above and which are drivingly connected to main drive shaft 424 via a plurality of gear sets. Although it is not shown in these figures, it should be appreciated by those with skill in the art that pumps 451a, 451b and 451c are mounted on the pump mounting surface of end cap 430 in the same manner as pump 51b is mounted on end cap 30, which is shown in FIG. 6.

For driving auxiliary pump 451c, driving force may be transferred from main drive shaft 424 and gear 452c to gear 427a, where gear 427a is also drivingly coupled to auxiliary shaft 427. Gears 452c and 427a are not shown but are preferably helical spur gears similar to previously shown gears 352c and 327a and mounted in gear chamber 445. Gear chamber 445 and pump chamber 450 operate and are formed similarly to gear chamber 45 and pump chamber 50 described above. For directly powering mower deck 89, a hydraulic motor 429 has been positioned proximate to mower deck 89 and hydraulically connected to auxiliary pump 451c via high pressure hoses 470c and 472c (not shown), which will be described in more detail below. Motor 429 drives output shaft 429a and output shaft 429a may act as a power take off shaft and drive mower deck 89. Motor 429 may be a piston motor, a gerotor, a geroller or other design.

Figure 28:
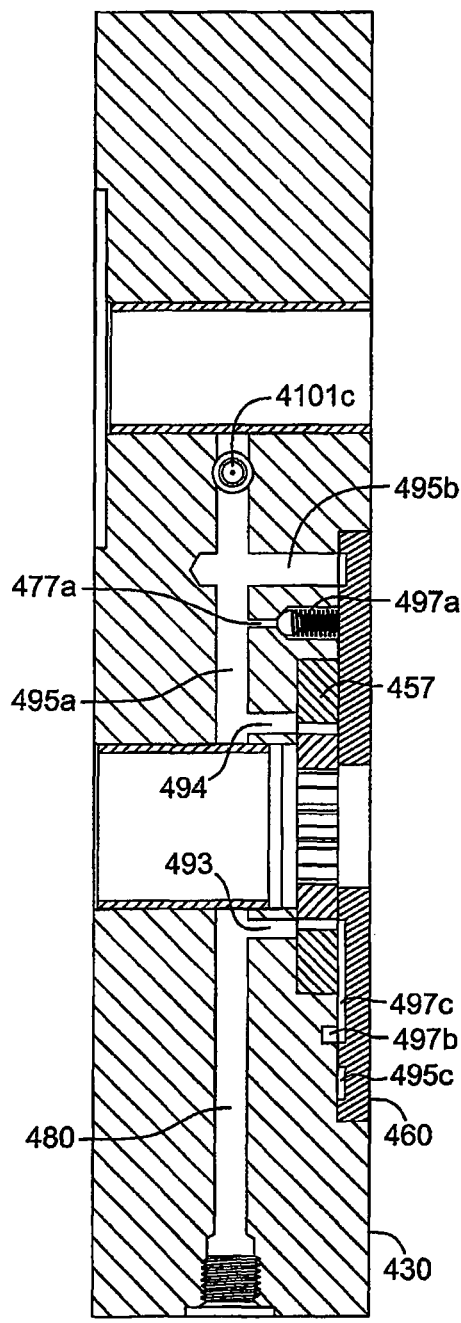
FIG. 28 is a cross-sectional view of the end cap shown in FIG. 27 along the lines 28-28 in FIG. 27.

As shown most clearly in FIG. 28 and similar to the embodiment depicted in FIG. 22, charge pump 457, which is a gerotor style charge pump, may be mounted in end cap 430 and splined to main drive shaft 424. Kidney 493 provides oil from passage 480 to charge pump 457. As shown in FIGS. 27-30, pressurized oil is then sent from charge pump 457 to charge gallery 495, composed of elements 495a, 495b and 495c, through passage 494. Charge pump 457 supplies charge fluid to all three rotatable pumps 451a, 451b and 451c through charge gallery 495 by supplying charge fluid from passage 494 to passage 495a and then through passage 495b to annular groove 495c formed in charge cover 460. Charge gallery 495 is also fluidly connected to each of pumps 451a and 451b via passages 495f and 495e and charge ports 482b and 482a, respectively. Charge gallery 495 may also provide charge fluid to auxiliary devices via charge ports 482c and 482d, which are connected to charge gallery 495c by charge passages 495g and 495d, respectively. Charge relief opening 477a is also formed in passage 495a to permit oil to be discharged therethrough by means of charge relief valve 497a in the event of excess oil pressure. The fluid that is discharged through charge relief valve 497a enters into charge relief passage 497b and is sent to charge relief outlet 497c formed in charge cover 460, which is in fluid connection with charge pump 457 and allows the fluid to re-enter the fluid system for the pump apparatus 410 therethrough. Note that annular groove 495c may also be formed in end cap 430 and charge relief passage 497b may be formed in charge cover 460.

For transferring driving force from main drive shaft 424 to output shaft 429*a*, auxiliary pump 451*c* and motor 429 are connected by high pressure hoses 470*c* and 472*c*. Further, hoses 470*c* and 472*c* are fluidly connected to system ports 471*c* and 473*c* on one end and at the other end directly to motor 429. As depicted in FIG. 27, which is a cross-sectional view of end cap 430 taken along lines 27-27 of FIG. 26, system ports 471 and 473 extend into respective first, second and third faces 430*a*, 430*b* and 430*c* of end cap 430, with ports 471*a* and 473*a* being in communication with first pump 451*a*, ports 471*b* and 473*b* being in communication with second pump 451*b*, and ports 471*c* and 473*c* being in communication with auxiliary pump 451*c*. Each of the ports 471*a-c* and 473*a-c* extend into end cap 430 along a respective longitudinal axis and, as seen in FIG. 27, the longitudinal axes of each set of ports 471*a-c* and 473*a-c* are at obtuse angels to the longitudinal axes of the other ports. Charge ports 482*c*, 482*d* extend into end cap 430 through respective fourth and fifth faces disposed between one of the other faces 430*a*, 430*b* or 430*c*. A set of check valves 4101*a-c* and 4103*a-c* may be threaded into respective openings 474*a-c* and 479*a-c* in end cap 430, corresponding to ports 471*a-c* and 473*a-c*. As shown in FIG. 27, check valves 4101*a-c* and 4103*a-c* may be positioned substantially coplanar, yet perpendicular to the respective system ports 471*a-c* and 473*a-c*. Check valves 4101*a* and 4103*a* are in communication with pump 451*a*, check valves 4101*b* and 4103*b* are in communication with pump 451*b*, and check valves 4101*c* and 4103*c* are in communication with auxiliary pump 451*c*.

As with the previous embodiments and as exemplified by FIG. 27, charge pump 457 draws hydraulic fluid from reservoir 86, which may be located either on vehicle 412 or on pump apparatus 410, and then through charge inlet line 491*a* and filter 92. Fluid from a case drain returns to reservoir 86 through a case drain line 491*b*.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A vehicle, comprising:
   a prime mover disposed on a vehicle frame;
   a mower deck engaged to the frame;
   a pair of driven wheels, each driven wheel being powered by a separate hydraulic motor and each hydraulic motor is disposed below the frame;
   a pump assembly disposed above the frame and comprising an end cap for supporting a first pump, a second pump and an auxiliary pump;
   a first set of hydraulic hoses connected between the end cap and the hydraulic motors to provide hydraulic fluid from the end cap to the hydraulic motors;
   a hydraulic deck motor engaged to the mower deck for powering the mower deck; and
   a second set of hydraulic hoses extending between the end cap and the hydraulic deck motor to provide hydraulic fluid from the auxiliary pump to the hydraulic deck motor.

2. The vehicle of claim 1, wherein the hydraulic deck motor is disposed below the vehicle frame.

3. The vehicle of claim 1, wherein the end cap has a first centrally located opening formed therein for an input shaft to extend therethrough, and a plurality of second openings formed therein, each second opening extending through a running surface for one of the first pump, the second pump and the auxiliary pump.

4. A vehicle having a prime mover disposed on a vehicle frame, the vehicle comprising:
   a mower deck attached to the vehicle frame;
   a bell housing attached to the prime mover;
   a power take off unit attached to the bell housing and driving the mower deck;
   a pump housing attached to the power take off unit, the pump housing including a first pump, a second pump and a third pump enclosed therein;
   a main input shaft drivingly coupled to an output shaft of the prime mover and extending through at least a portion of the bell housing and the pump housing, the main input shaft extending entirely through the power take off unit, where the output shaft of the prime mover and the main input shaft are substantially coaxial; and
   a first pump shaft driving the first pump, a second pump shaft driving the second pump, and a third pump shaft driving the third pump, wherein the main input shaft is parallel to and drives the first, second and third pump shafts.

5. The vehicle of claim 4, wherein the first pump and the second pump are on generally opposite sides of the main input shaft, the third pump is generally on one side of the first pump, the second pump and the main input shaft, and the power take off unit is generally opposite the third pump on a second side of the first pump, the second pump and the main input shaft.

6. The vehicle of claim 5, further comprising a first pulley coupled to the main input shaft, an electric clutch for engaging and disengaging the first pulley to and from the main input shaft and a second pulley drivingly attached to the first pulley by a belt.

7. The vehicle of claim 6, wherein the mower deck is activated by actuating the electric clutch.

8. The vehicle of claim 4, further comprising a fan powered by the main input shaft and having an axis of rotation that is collinear with the axis of rotation of the main input shaft.

9. The vehicle of claim 4, further comprising an end cap having a first side secured to the pump housing, wherein the end cap and the pump housing cooperate to form a sump for the first pump and the second pump.

10. The vehicle of claim 9, further comprising a gear chamber located on a second side of the end cap opposite to the first side, and a plurality of gears disposed in the gear chamber, wherein at least one of the plurality of gears is engaged to and driven by the main input shaft.

11. The vehicle of claim 10, further comprising at least one pump shaft extending through the end cap and being engaged to and driven by one of the plurality of gears, and being engaged to and driving one of the first pump, the second pump or the third pump.

12. The vehicle of claim 10, wherein the third pump is disposed external to the sump, and is driven by a pump shaft engaged to and driven by one of the plurality of gears.

13. The vehicle of claim 4, wherein the power take off unit comprises a power take off shaft, and the bell housing and the pump housing are disposed above the vehicle frame and the power take off shaft is below the vehicle frame.

14. The vehicle of claim 3, wherein each of the second openings are equidistant from the first opening.

15. A vehicle having a prime mover disposed on a vehicle frame, the vehicle comprising:
   a mower deck attached to the vehicle frame;
   a bell housing attached to the prime mover;
   a pump housing attached to the bell housing;

an end cap having a first side secured to the pump housing, wherein the end cap and the pump housing cooperate to form a sump;

a first pump, a second pump and a third pump disposed on the end cap and located in the sump;

a main input shaft extending through the pump housing;

a first pump shaft driving the first pump, a second pump shaft driving the second pump, and a third pump shaft driving the third pump, wherein the main input shaft is parallel to and drives the first, second and third pump shafts; and a power take off unit disposed on the end cap and driving the mower deck.

16. The vehicle of claim 15, wherein the power take off comprises a motor disposed on the end cap and hydraulically powered by the third pump, and a power take off shaft driven by the motor and extending through the end cap.

17. The vehicle of claim 15, further comprising a gear chamber located on a second side of the end cap opposite to the first side, and a plurality of gears disposed in the gear chamber, wherein at least one of the plurality of gears is engaged to and driven by the main input shaft.

18. The vehicle of claim 17, wherein the first pump shaft, the second pump shaft and the third pump shaft each extend through the end cap and are engaged to and driven by one of the plurality of gears.

19. The vehicle of claim 18, wherein the power take off comprises a motor disposed on the end cap and hydraulically powered by the third pump, and a power take off shaft driven by the motor and extending through the end cap.

20. The vehicle of claim 19, wherein the bell housing and the pump housing are disposed above the vehicle frame, and the power take off is disposed below each of the first pump, the second pump and the third pump, and the power take off shaft is disposed below the vehicle frame.

* * * * *